(12) United States Patent
Maeta et al.

(10) Patent No.: US 7,958,458 B2
(45) Date of Patent: Jun. 7, 2011

(54) METHOD FOR SUPPORTING DATA LINKAGE BETWEEN APPLICATIONS

(75) Inventors: Takayuki Maeta, Tokyo (JP); Yutaka Katsumata, Tokyo (JP); Shinichi Eguchi, Tokyo (JP); Katsutoshi Kobara, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 343 days.

(21) Appl. No.: 11/137,364

(22) Filed: May 26, 2005

(65) Prior Publication Data

US 2005/0213824 A1  Sep. 29, 2005

Related U.S. Application Data

(63) Continuation of application No. PCT/JP03/00802, filed on Jan. 28, 2003.

(51) Int. Cl.
G06F 3/048 (2006.01)
G06F 3/00 (2006.01)

(52) U.S. Cl. ........ 715/804; 715/724; 345/629; 382/293; 382/298; 382/305

(58) Field of Classification Search .................. 715/724, 715/804; 345/128, 629; 382/293, 298, 305
See application file for complete search history.

(56) References Cited

U.S. PATENT DOCUMENTS

| | | | | |
|---|---|---|---|---|
| 5,586,240 A | * | 12/1996 | Khan et al. | 715/201 |
| 5,815,149 A | * | 9/1998 | Mutschler et al. | 715/762 |
| 5,819,261 A | * | 10/1998 | Takahashi et al. | 707/3 |
| 5,889,518 A | * | 3/1999 | Poreh et al. | 715/804 |
| 5,900,005 A | | 5/1999 | Saito | |
| 5,911,044 A | * | 6/1999 | Lo et al. | 709/203 |
| 6,272,235 B1 | * | 8/2001 | Bacus et al. | 382/133 |
| 6,339,767 B1 | * | 1/2002 | Rivette et al. | 707/781 |
| 6,480,304 B1 | * | 11/2002 | Os et al. | 358/474 |
| 7,116,807 B1 | * | 10/2006 | Brackett | 382/128 |
| 2002/0063724 A1 | * | 5/2002 | Powers et al. | 345/629 |
| 2002/0138827 A1 | * | 9/2002 | Yoshimine et al. | 725/1 |
| 2003/0018235 A1 | * | 1/2003 | Chen et al. | 600/109 |
| 2003/0149641 A1 | * | 8/2003 | Kouketsu et al. | 705/27 |
| 2006/0259938 A1 | * | 11/2006 | Kinoshita et al. | 725/118 |

FOREIGN PATENT DOCUMENTS

| | | |
|---|---|---|
| JP | 7-28801 | 1/1985 |
| JP | 5-257714 | 10/1993 |
| JP | 5-290049 | 11/1993 |
| JP | 8-83285 | 3/1996 |
| JP | 9-198506 | 7/1997 |
| JP | 9-282477 | 10/1997 |
| JP | 9-305351 | 11/1997 |
| JP | 10-240901 | 9/1998 |
| JP | 11-265404 | 9/1999 |
| JP | 11-312231 | 11/1999 |

(Continued)

OTHER PUBLICATIONS

Notice of Rejection issued in corresponding Korean Patent Application No. 10-2005-7009628, mailed on May 31, 2007.

(Continued)

Primary Examiner — Steven P Sax
Assistant Examiner — Linh K Pham
(74) Attorney, Agent, or Firm — Staas & Halsey LLP

(57) ABSTRACT

A screen plug extracts screen image data of a display screen from a target application and acquired data to be linked from the screen image data. The acquired data is output to a linkage application. Thus the screen plug realizes data linkage between the linkage application and the target application.

9 Claims, 31 Drawing Sheets

FOREIGN PATENT DOCUMENTS

| | | |
|---|---|---|
| JP | 2000-48215 | 2/2000 |
| JP | 2000-194869 | 7/2000 |
| JP | 2001-52015 | 2/2001 |
| JP | 2001-118077 | 4/2001 |
| JP | 2002-222196 | 8/2002 |
| WO | WO 01/16720 | 3/2001 |

OTHER PUBLICATIONS

Oeb;normalffice Action for corresponding Chinese Patent Application No. 03825439.5 dated Jun. 9, 2006.

Notice of Rejection issued in corresponding Japanese Patent Application No. 2004-567517, mailed on Dec. 25, 2007.

International Search Report issued Jan. 11, 2008 in corresponding International Application No. PCT/JP2003/00802.

European Search Report issued in corresponding European Patent Application No. 03 703 065.7.1243 on Jul. 8, 2008.

European Office Action dated Jul. 15, 2010 issued in corresponding European Patent Application No. 03 703 065.7.

Office Action for corresponding Korean Application No. 10-2005-7009628 mailed Aug. 31, 2006.

* cited by examiner

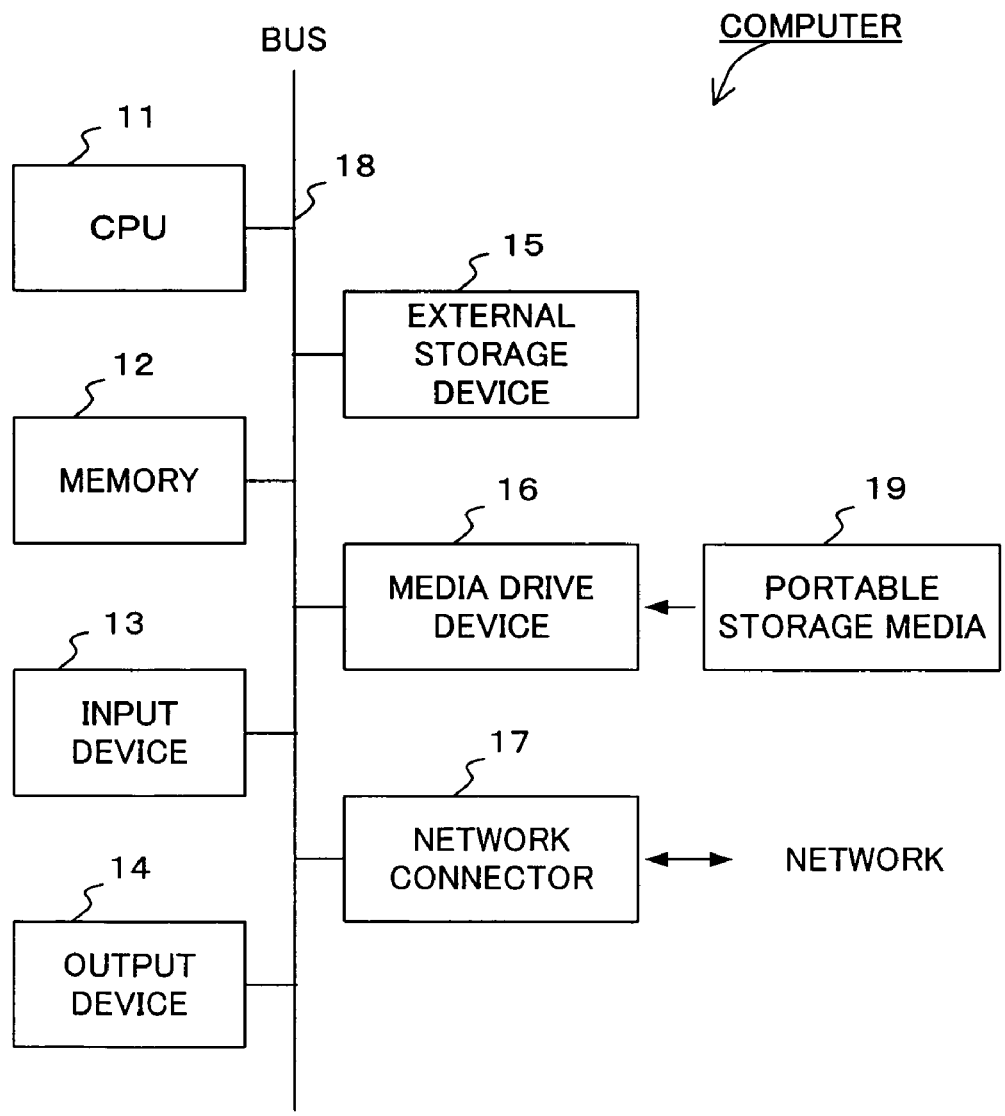
F I G. 1

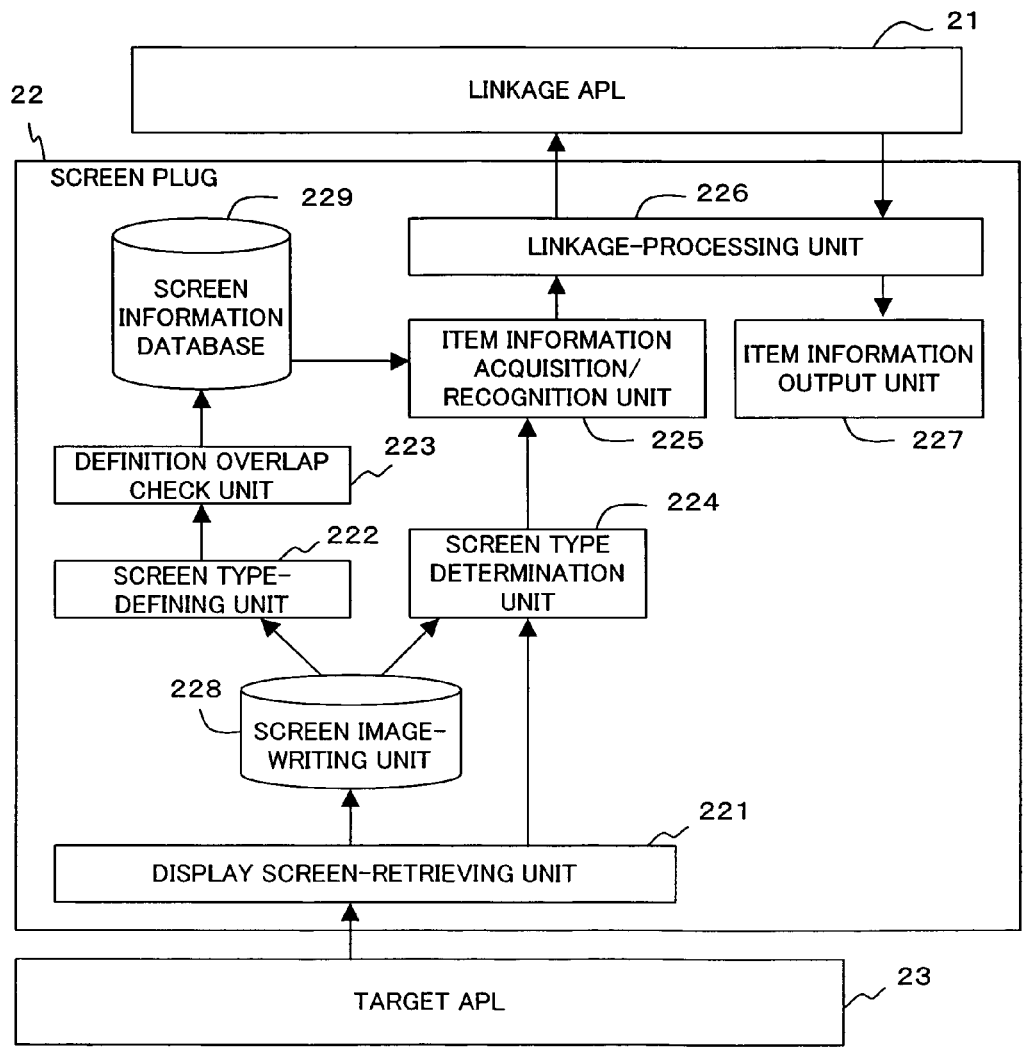
F I G. 3

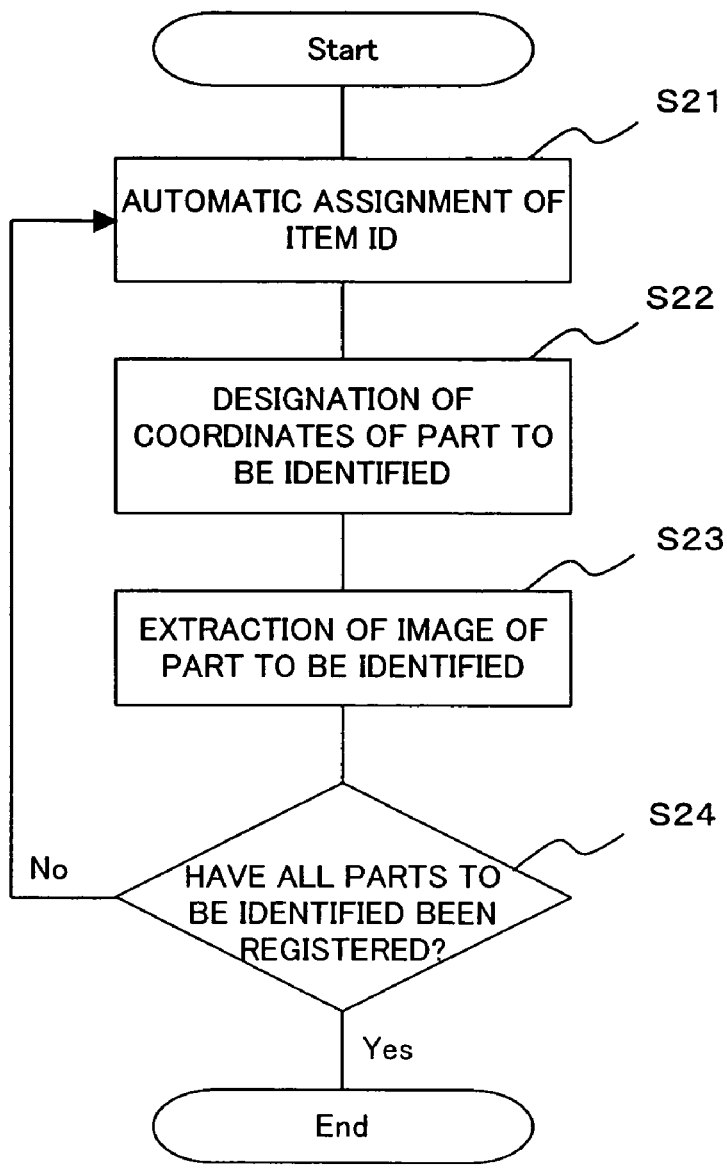
F I G. 8

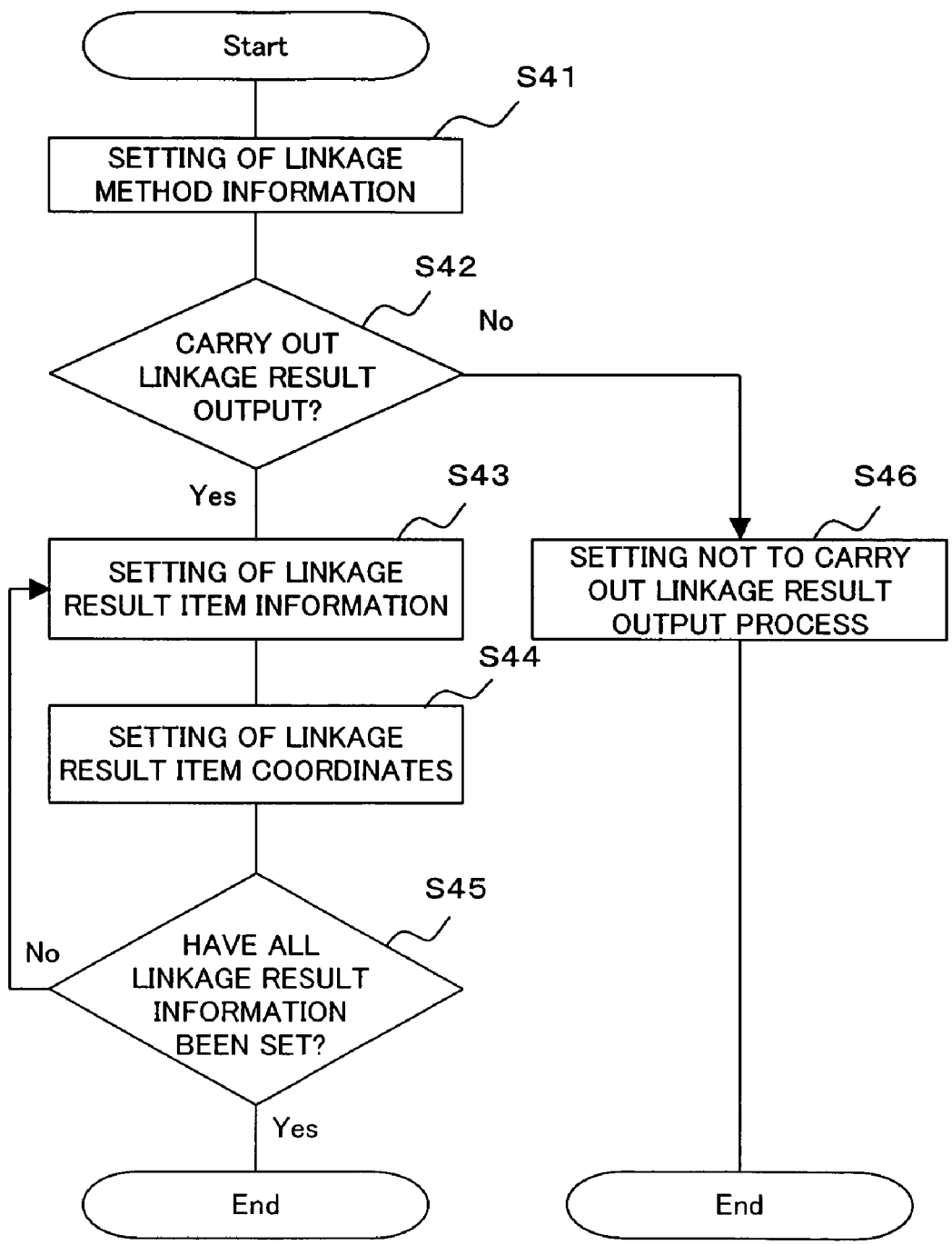
F I G. 10

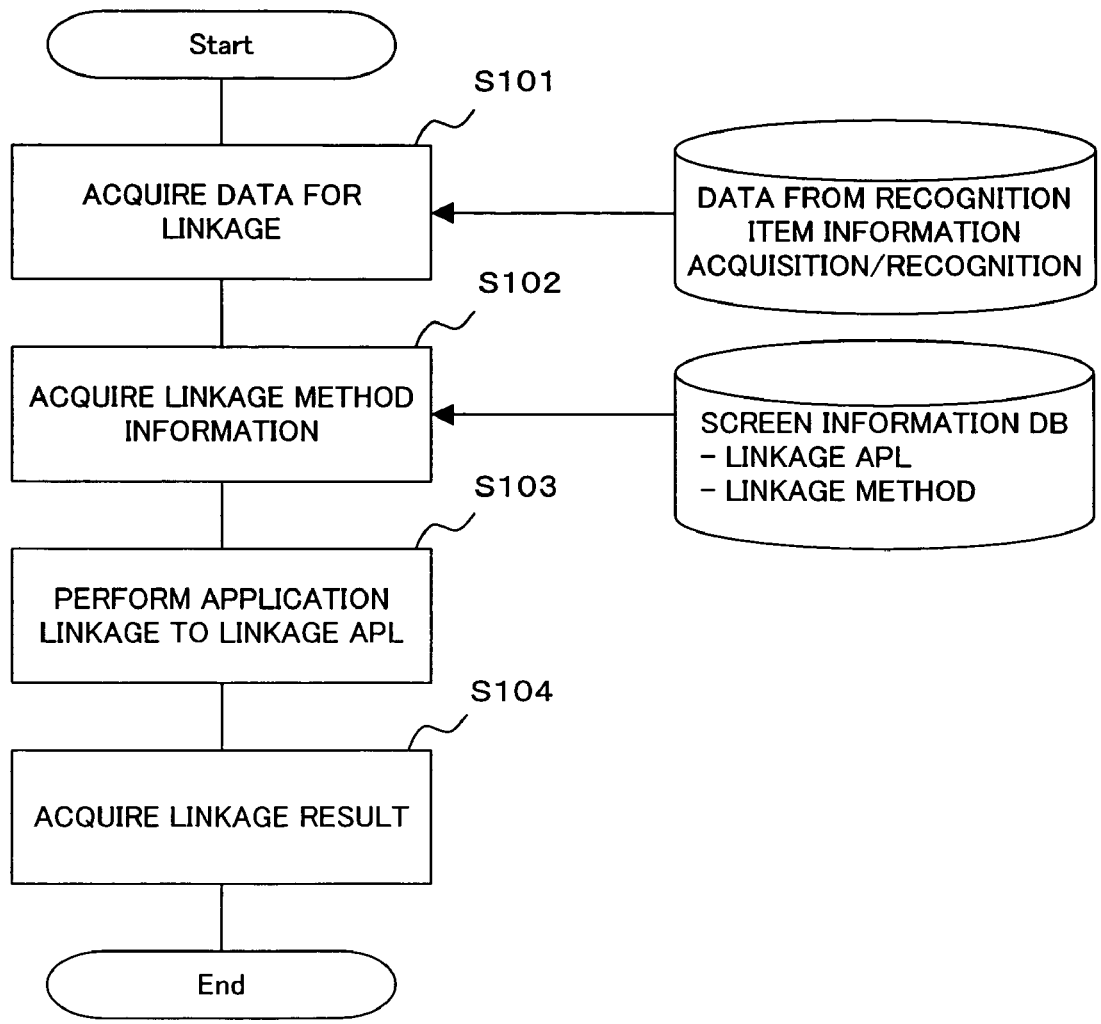
F I G. 1 5

FINANCIAL SERVICE MONEY TRANSFER SAMPLE

Menu 00201

MONEY TRANSFER PROCESS

| TRANSACTION INFORMATION INPUT | RETRIEVED SEAL |

CIF NUMBER  042-631682

CUSTOMER NAME  ABCDEF

AMOUNT OF TRANSFER  ¥152,000

VERIFICATION RESULT (ABC DEF)

Menu1  Menu2  Menu3  Menu4  Menu5  Menu6  Menu7  Menu8

F I G. 1 7

| CATEGORY NAME | COORDINATES | IMAGE |
|---|---|---|
| PROCESS NAME | 51,54-160,74 | MONEY TRANSFER PROCESS |
| SCREEN No. | 474,37-541,56 | Menu 00201 |

FIG. 18

| CATEGORY NAME | COORDINATES | DATA PROPERTY |
|---|---|---|
| CIF NUMBER | 126,127-295,147 | CHARACTER DATA |
| CUSTOMER NAME | 364,126-463,220 | EDIT CONTROL |
| AMOUNT OF TRANSFER | 364,126-463,220 | STATIC CONTROL |
| RETRIEVED SEAL | 364,126-463,220 | IMAGE DATA |

FIG. 19

| LINKAGE PROGRAM NAME | LINKAGE METHOD |
|---|---|
| SEAL VERIFICATION PROGRAM | TCP/IP SOCKET COMMUNICATION |

FIG. 20

| ITEM NAME | COORDINATES |
|---|---|
| VERIFICATION RESULT | 126,127-295,147 |

FIG. 21

| EXTRACT AS PROCESS NAME | | EXTRACT AS SCREEN No. |

FINANCIAL SERVICE MONEY TRANSFER SAMPLE

Menu 00201

MONEY TRANSFER PROCESS

TRANSACTION INFORMATION INPUT     RETRIEVED SEAL

CIF NUMBER        042-631682

CUSTOMER NAME     ABCDEF            ABC DEF

AMOUNT OF TRANSFER ¥152,000

VERIFICATION RESULT

Menu1  Menu2  Menu3  Menu4    Menu5  Menu6  Menu7  Menu8

F I G. 2 2

| ITEM NAME | IMAGE IN DB | EXTRACTED IMAGE |
|---|---|---|
| PROCESS NAME | MONEY TRANSFER PROCESS | MONEY TRANSFER PROCESS |
| SCREEN No. | Menu 00201 | Menu 00201 |

FIG. 23

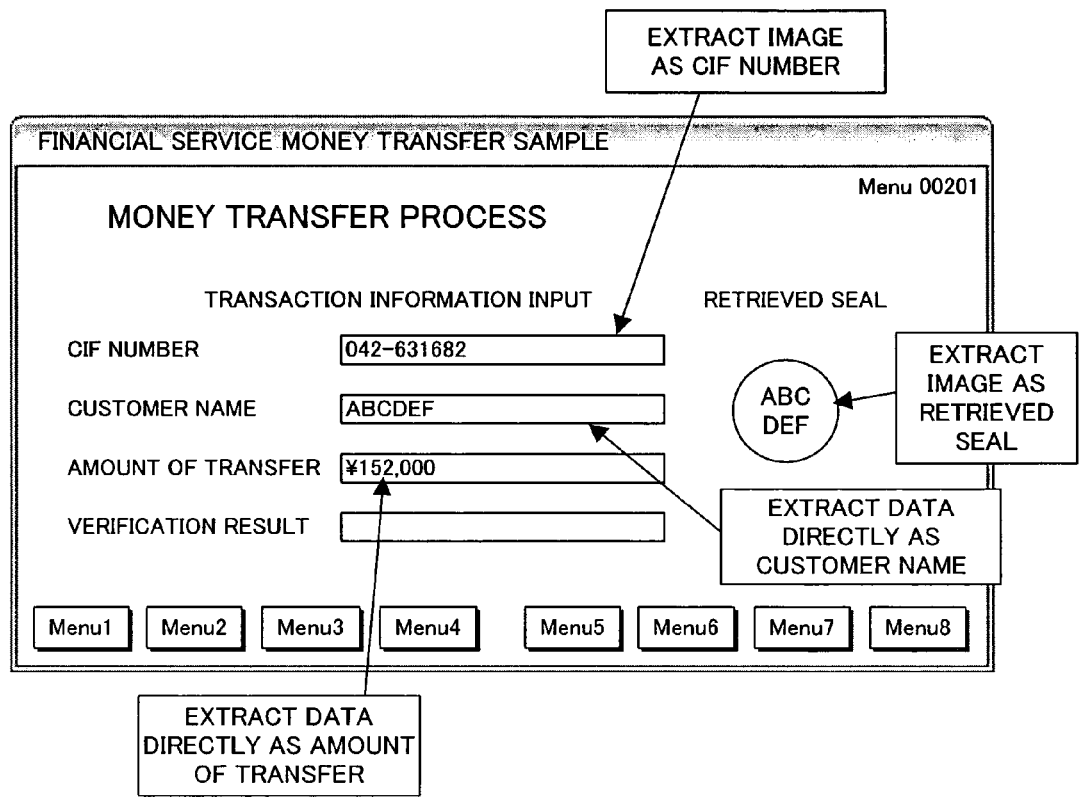
F I G. 2 4

RECOGNITION RESULT CONFIGURATION SCREEN

SCREEN RECOGNITION/CHARACTER RECOGNITION ARE COMPLETED.
SCREEN RECOGNITION RESULT JUDGES AS SCREEN "FINANCIAL
SERVICE PROCESS SAMPLE"

| | |
|---|---|
| CIF NUMBER | 042-631682 |
| | 042-631682 |
| CUSTOMER NAME | ABCDEF |
| | ABCDEF |
| AMOUNT OF TRANSFER | ¥152,000 |
| | ¥152,000 |
| RETRIEVED SEAL | ABC DEF |

CONFIRM/MODIFY CHARACTER RECOGNITION RESULT, AND SELECT
START LINKAGE OR CANCEL

[ START LINKAGE ]   [ CANCEL ]

F I G. 2 6

SEAL MASTER SAMPLE VERIFICATION RESULT

CIF NUMBER    042-631682

CUSTOMER NAME  ABCDEF

| BRANCH NAME | TEST BRANCH 1 |
|---|---|
| BRANCH NUMBER | 042 |
| ACCOUNT NUMBER | 1647563 |
| SEAL NUMBER INFORMATION | SEAL NUMBER 1/1 |
| DATA OF OPENING ACCOUNT | 12/25/04 |

RETRIEVED SEAL     REGISTERED SEAL          VERIFICATION RESULT (ABC DEF)          (ABC DEF)                (ABC DEF)

F I G.  2 7

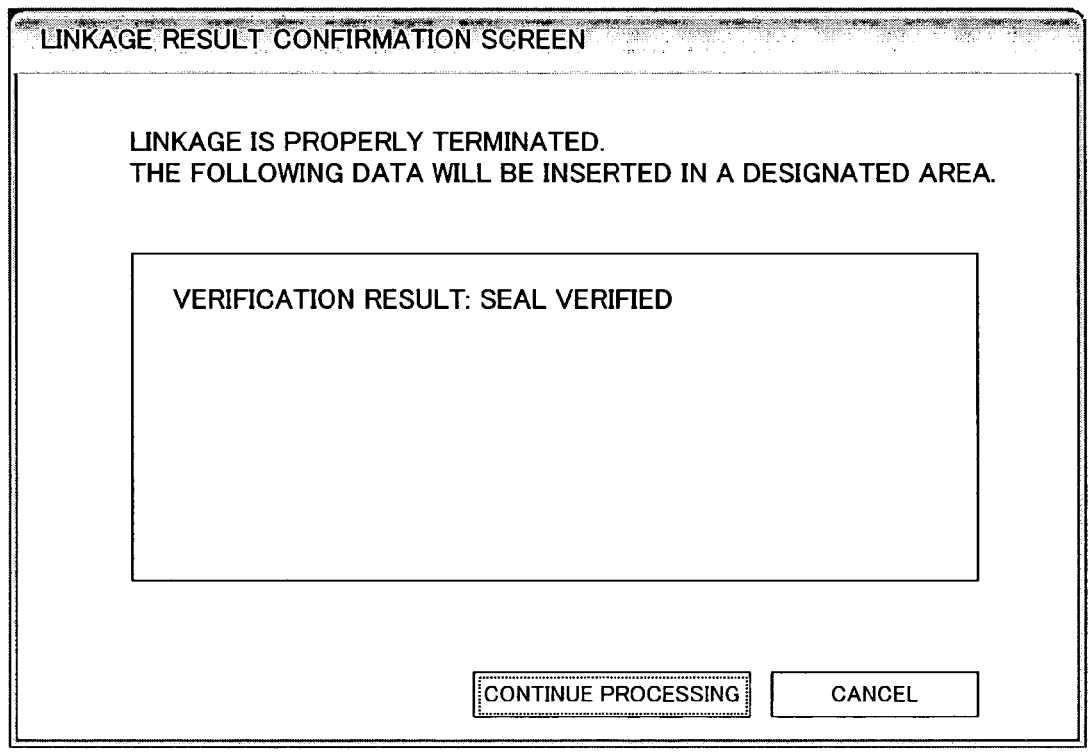
F I G. 2 8

METHOD FOR SUPPORTING DATA LINKAGE BETWEEN APPLICATIONS

CROSS-REFERENCE TO RELATED APPLICATIONS

This application is a continuation of International Application No. PCT/JP2003/000802, which was filed on Jan. 28, 2003.

BACKGROUND OF THE INVENTION

1. Field of the Invention

The present invention relates to a technique of linking data between applications.

2. Description of the Related Art

It is sometimes the case that system modifications are required so that information, displayed in a display screen of an application (hereinafter referred to as a target APL), can be used by other applications (hereinafter referred to as a linkage APL). In such a case, according to conventional art, the following procedure is followed.

1) A screen displaying data items of the target APL is output on paper etc., and by manual effort, the required data items from the screen are re-entered in the linkage APL.
2) Both APLs are modified so that data linkage between the target APL and the linkage APL can be realized.

According to the conventional art, because the procedure 1) requires manual effort during the working operation, a problem of a burden of data input is caused and incorrect-input might occur. In the procedure 2), not only the linkage APL but also the target APL must be modified, and therefore the scale of system development becomes large, increasing development budgets and development time which is a problem. Also when the developer of the target APL is different from that of the linkage APL, disclosure of confidential information may be required, and therefore the target APL cannot be modified without the consent of both developers.

According to Japanese unexamined patent publication bulletin No. 08-83285, a system, which retrieves data output on paper as image data using a scanner, recognizes an area displaying characters from the image data, generates character code from the image data in the recognized area and registers the character code in a database, is described.

According to Japanese unexamined patent publication bulletin No. 10-240901, a system, which stores layout rules of document structure in advance, accumulates image data of the document, analyzes layout of the accumulated data based on the layout rules, extracts the character pattern from the image data based on the analysis result, recognizes the character from the extracted character pattern, and stores the results of character recognition in a file, is disclosed.

Both inventions allow the elimination of the reentry by manual effort described in the procedure 1). However, in order to realize data linkage between programs, both inventions still have the problems that it is required that the screen is output on paper and the target APL and the linkage APL to be modified.

SUMMARY OF THE INVENTION

It is an object of the present invention to eliminate the output of the screen to paper media, input of data items by manual effort, and modification of the target APL and the linkage APL when modifying the system so that the system allows data linkage between the target APL and the linkage APL.

In order to achieve the above object, according to one mode of the present invention, a data linkage supporting device, which supports data linkage between programs, comprises display screen retrieving means for acquiring screen image data of a display screen from a primary program (the target APL), item information acquisition means for acquiring linkage data to be output to a secondary program (the linkage APL) from the acquired screen image data, and item information output means for outputting the acquired linkage data to the secondary program.

In the above configuration, display screen in a primary program is not output to paper etc., but is taken from the primary program as a screen image, linkage data is obtained from the acquired screen image and the obtained linkage data is output to the secondary program. By so doing, the above object can be achieved.

The data linkage supporting device also comprises, based on coordinate information indicating an area of the display screen and screen type determination information comprising image data displayed in the area, screen type determination means for extracting image data displayed in the area from the screen image data and for identifying a display screen by determining whether or not the extracted image data and image data comprised in the screen type determination information correspond with each other. And the item information acquisition means can acquire the linkage data from screen image data of the identified display screen.

By so doing, it is possible to carry out the identification of the display screen automatically based on the image data.

The item information acquisition means can be a means, which can, based on coordinate information indicating an area on the screen and recognition item information comprising data property information, indicating properties of data displayed on the screen, extract data displayed in the area from the screen image data and recognize the extracted data according to the data property information, and in which the linkage data is acquired as recognition result.

The data linkage supporting device can further comprises item information output means for outputting the linkage data processed by the secondary program to the primary program. Such a device enables the return of the processing-result of the linkage data by the secondary program to the primary program.

In the item information output means, based on output method information containing coordinate information indicating an area of the display screen, the linkage data processed by the secondary program can be output in the area in the display screen of the primary program.

According to another mode of the present invention, a data linkage supporting device, which supports data linkage between programs, comprises display screen retrieving means for retrieving screen image data of the display screen from the primary program, screen type determination means, based on coordinate information indicating an area of the display screen and the screen type determination information displayed in the area, for extracting image data displayed on the area from the screen image data and for identifying the display screen by determining whether or not the extracted image data corresponds with the image data contained in the screen type determination information, and item information output means for outputting the linkage data processed by the secondary program to the primary program.

In the above configuration, it is possible to acquire the display screen in the primary program as screen image data, to identify the display screen acquired based on the acquired screen image data, and to output the data processed by the secondary program on the identified display screen. By so doing, data linkage between the primary and the secondary programs without modifying either the primary or the secondary program, and the above object can be achieved.

By a data linkage supporting method carrying out procedures of the same process as the process by the data linkage supporting device, operation and effect similar to the above computer are obtained. Consequently, it is possible to achieve the above object by employing the data linkage supporting method.

A program causing a processor to take control, which is similar to the procedures, carried out in the data linkage supporting method, can also achieve the above object by the execution of the program by the processor. Furthermore, by reading out the program to the processor from recoding media (recording device), recording the program and executing the program, the object can be achieved.

BRIEF DESCRIPTION OF THE DRAWINGS

FIG. 1 describes a configuration of a computer;
FIG. 3 illustrates the functional configuration of a screen plug;
FIG. 8 is a flowchart showing procedures of the screen type determination defining subroutine;
FIG. 10 is a flowchart showing procedures of linkage method defining subroutine;
FIG. 15 is a flowchart showing procedures of a linkage process;
FIG. 17 gives an example of a display screen of a target APL;
FIG. 18 gives an example of screen type determination information;
FIG. 19 gives an example of recognition item information;
FIG. 20 gives an example of linkage method information;
FIG. 21 gives an example of output method information;
FIG. 22 explains an area extracted from screen image data;
FIG. 23 explains a part masked in the image comparison subroutine;
FIG. 24 explains a process for acquiring data to be linked from the screen image data and recognizing the data;
FIG. 26 illustrates an example of a confirmation screen of the recognized items acquired from the screen shown in FIG. 24;

FIG. 27 illustrates an example of a screen showing the result of a seal verification process by the linkage APL;
FIG. 28 illustrates an example of a confirmation screen of a linkage process result.

DESCRIPTION OF THE PREFERRED EMBODIMENTS

Figure 2:
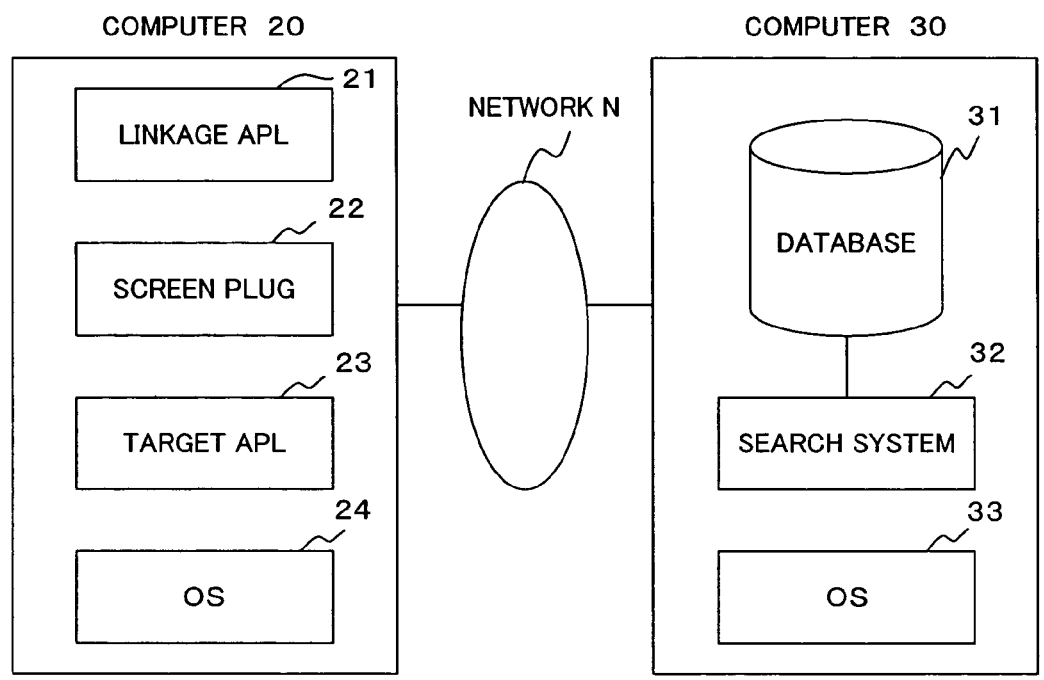
FIG. 2 describes a configuration of a system relating to the first embodiment.

In the following description, embodiments of the present invention are explained with reference to the accompanying drawings. The devices that are the same as those that are described once have the same reference numbers throughout the explanation, and the explanations of such devices are omitted subsequently.

The present invention is realized by using a computer. First, an explanation of a configuration of the computer is provided using FIG. 1.

As described in FIG. 1, the computer comprises a CPU 11, memory 12, an input device 13, an output device 14, an external storage device 15, a media driving device 16, and a network connector 17, and these are connected to each other by a bus 18.

The memory 12 includes ROM (Read Only Memory), RAM (Random Access Memory), for example, and stores programs and data used for processing. A data linkage support program (explained later), which causes the computer to execute support control of data linkage between programs, is stored in a designated program code segment in the memory 12 of the computer. The memory 12 realizes a screen image-writing unit 228 described later.

The CPU 11 performs necessary process by executing the program utilizing the memory 12. Storing the data linkage support program in the memory 12 and causing the CPU to execute the program enables the computer to function as a data linkage support device.

The input device 13 can be a keyboard, a pointing device, and a touch panel, for example, and is used for input of information and commands from users. The output device 14 can be a display and a printer, for example, and is used for output of processing results and querying computer users.

The external storage device 15 is a magnetic disk device, an optical magnetic device, a magneto-optical disk device, for example. The external storage device 15 realizes screen information DB 229 described later. In addition, the program described above can be stored in the external storage device 15 of the computer, and can be executed by loading into the memory 12 when needed.

The media-driving device 16 drives a portable recording medium 19 and accesses its recorded content. For the portable recording media 19, any computer-readable recording media such as a memory card, a memory stick, a flexible disk, a CD-ROM (Compact Disc Read Only Memory), an optical disk, a magnet-optical disk, a DVD (Digital Versatile Disk), can be used. The data linkage support program described above can be stored in the portable recording media and can be executed by loading it into the memory 12 of the computer when needed.

The network connector 17 communicates with external devices via any network (any line) such as a LAN and a WAN, and carries out data conversion involving the communication.

Also, when requested, it receives the program from external devices, and executes it by loading it into the memory 12 of the computer.

Next, a configuration of the system relating to the first embodiment of the present invention is explained using FIG. 2.

As described in FIG. 2, a computer 20 has a linkage APL 21, a data linkage support program (hereinafter referred to as a screen plug) 22, a target APL 23 and an operating system (hereinafter referred to as an OS) 24 installed.

The linkage APL 21 receives data to be linked from the target APL 23 through the screen plug 22, and carries out the processing of the data based on a designated algorithm.

The screen plug 22 retrieves the screen image data of the display screen from the target APL 23, and acquires data from the screen image data. And it outputs the acquired data to the linkage APL 21. By so doing, the screen plug 22 realizes data linkage between the linkage APL 21 and the target APL 23. The screen plug 22 returns a processing result by the linkage APL 21 to the target APL when required.

The target APL 23 processes data based on a designated algorithm. The OS 24 provides a system management function to applications such as the linkage APL 21, the screen plug 22 and the target APL 23.

The processing of the linkage APL 21 and the target APL 23, to which the screen plug 22 links data, can be any arbitrary process. In FIG. 2, an example is shown in which the computer 20 and the computer 30 are connected via a network, the target APL 23 of the computer 20 acquires data from a database 31 of the computer 30 via a search system 32 and carries out processing of the data. Here, a network N can be one network or can be a combination of a plurality of networks. As the network N, it is possible to use a WAN (Wide Area Network) and a LAN (Local Area Network) etc. of the Internet, a telephone line network, a wireless network, for example.

In the following description, the functional configuration of the screen plug 22 is explained with reference to FIG. 3. As described in FIG. 3, the screen plug 22 comprises a display screen-retrieving unit 221, a screen type-defining unit 222, a definition overlap check unit 223, a screen type determination unit 224, an item information acquisition/recognition unit 225, a linkage-processing unit 226, an item information output unit 227, a screen image-writing unit 228, and a screen information database (database is hereinafter abbreviated to DB) 229.

The process, which the screen plug 22 carries out, can be roughly divided into a screen defining process and a data linkage process. The former, carried out before the data linkage, is a process to define which place the data to be acquired from target APL is located and in what form the data present, and to which program and how the acquired data is to be output. This process is carried out by the display screen retrieving unit 221, the screen type defining unit 222, and the definition overlap check unit 223, and the result of the process is written to the screen information DB 229. The latter is a process to link the data extracted from the target APL 23 to the linkage APL 21 based on the result of the screen defining process. This process is carried out by the display screen-retrieving unit 221, the screen type determination unit 224, the item information acquisition/recognition unit 225, the linkage-processing unit 226, and the item information output unit 227. In this process, the result of the screen defining process written to the screen information DB 229 is used.

In the following description, the processing, which each unit performs, is explained.

The display screen-retrieving unit 221 retrieves screen image data of the display screen from the target APL 23, and writes the data into the screen image-writing unit 228.

The screen type defining unit 222 creates screen definition information, which defines a location in the screen and a property of the data to be retrieved from the target APL 23, based on the screen image data written to the screen image-writing unit 228. Details of the information contained in the screen definition information are explained later. The definition overlap check unit 223 confirms whether or not the screen definition information created by the screen type-defining unit 222 overlaps with the screen definition information stored in the screen information DB 229. If it is confirmed that they do not overlap each other, the created screen definition information is stored in the screen information DB 229.

The screen type determination unit 224 identifies the retrieved screen based on the screen definition information stored in the screen information DB 229 and the screen image data written into the screen image-writing unit 228. If the screen is identified, the item information acquisition/recognition unit 225 extracts data to be linked to the linkage APL 21 from the screen image data based on the screen definition information.

The linkage-processing unit 226 outputs the extracted data to a prescribed data area of the linkage APL 21, which the data is to be linked to, by a prescribed linkage method. The linkage APL to be linked with the data is designated in advance by linkage identification recognition information, and the linkage method of the data is defined in advance by link method designating information. Both linkage destination identification information and link method designating information are contained in the screen defining information. The linkage-processing unit 226, also, receives processed data from the linkage APL 21, and outputs it to the item information output unit 227. The item information output unit 227 outputs the data processed by the linkage APL 21 to the target APL 23 or the other applications. The output destination of the processing result by the linkage APL 21 is designated by output destination defining information contained in the screen defining information. FIG. 2 shows a case where the processing result by the linkage APL 21 is sent back to the target APL 23.

In the screen image-writing unit 228, the screen image data, retrieved by the display screen-retrieving unit 221 is written. Into the screen image-writing unit 228, in principle, the screen image data of the screen currently to be processed by a screen defining process or by a data extraction process, is written.

In the screen information DB 229, the screen defining information created by the screen type-defining unit 222 is stored.

Figure 4:
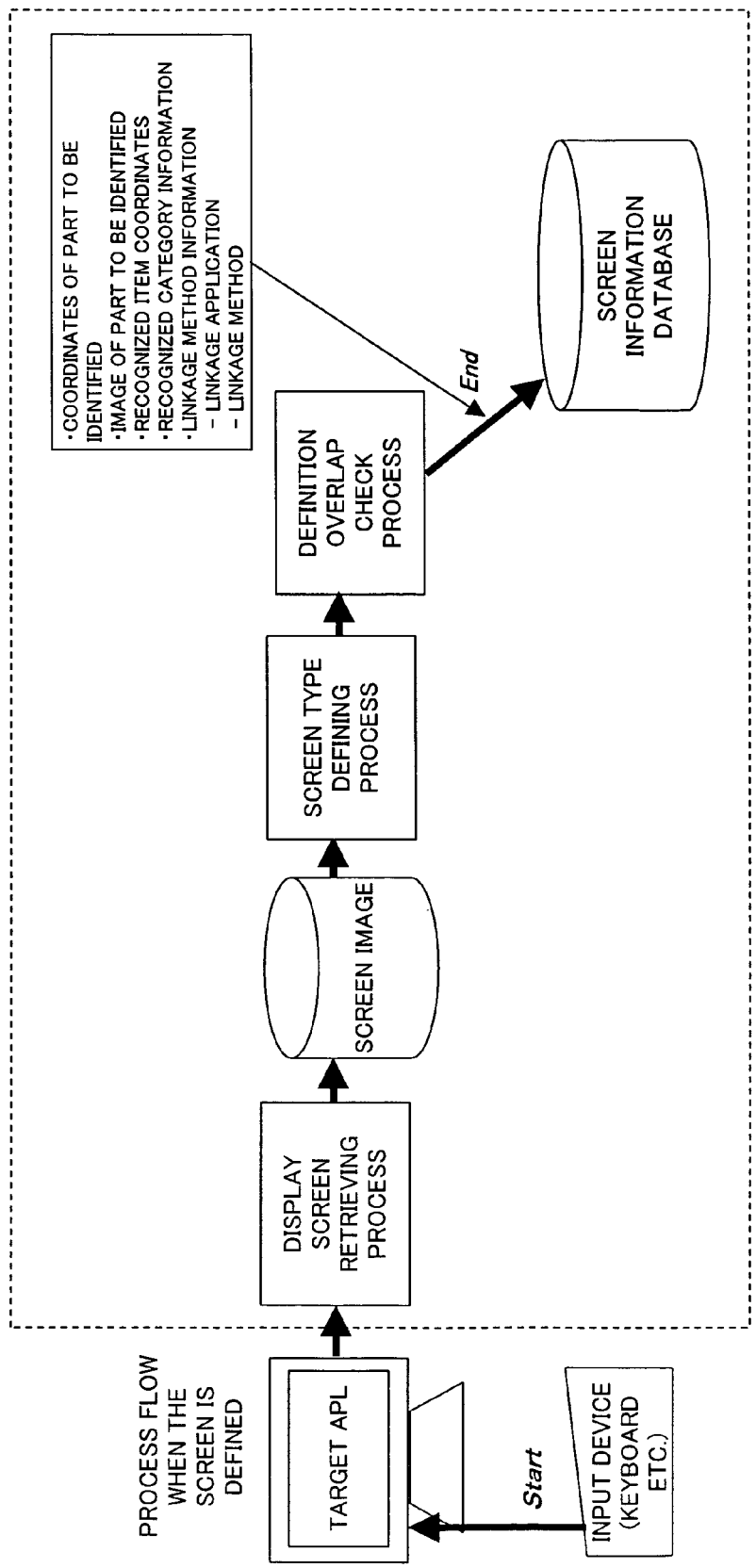
FIG. 4 explains an overview of a screen defining process.
Figure 5:
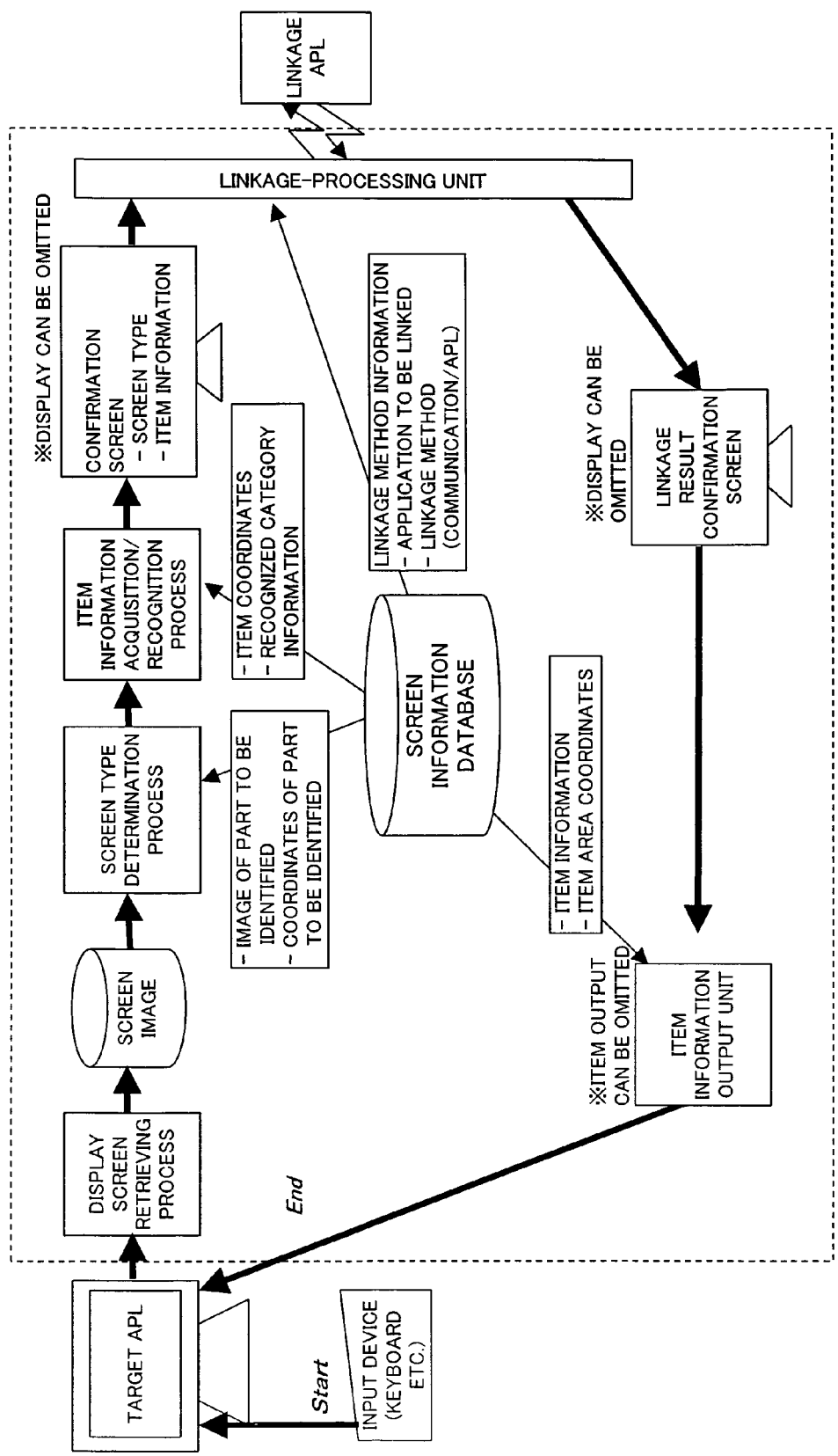
FIG. 5 explains an overview of a data linkage process.

In the following description, an overview of the screen defining process and the data linkage process is explained referring to FIG. 4 and FIG. 5. In FIG. 4 and FIG. 5, the process carried out by the screen plug 22 is surrounded by a broken line. Details of each process are provided later.

First, an overview of the screen defining process is explained. The screen defining process starts upon input from the input device 13 such as keyboard, the display screen-retrieving unit 221 carries out a display screen retrieving process, which retrieves a display screen from the target APL 23. The screen image data of the retrieved screen is written to the screen image-writing unit 228. The screen type-defining unit 222 creates the screen defining information based on the screen image data written to the screen image-writing unit 228 and user commands, and writes the created screen defining information to the screen information DB 229. The definition overlap check unit 223 carries out a definition overlap check process, which checks whether or not the screen defining information stored in the screen information DB 229 overlaps with each other. As a result of the check, if there is an overlap, the definition overlap check unit 223 outputs information indicating the overlap.

Next, an overview of the data linkage process is explained. When the screen defining process starts upon input from the input device 13, such as a keyboard, the display screen-retrieving unit 221 carries out a display screen retrieval process, which retrieves a display screen from the target APL 23. The screen image data of the retrieved screen is written into the screen image-writing unit 228. The screen type determination unit 224 reads out the screen defining information from the screen information DB 229, and identifies the screen which the screen image data thereof is written to the screen image-writing unit 228 based on the screen defining information. The item acquisition/recognition 225 extracts the data to be output from the screen image data to the linkage APL 21 based on the recognition result and the screen defining information corresponding to the screen, and causes the output device 14 to display the confirmation screen for confirmation of the extracted data. Users can confirm the extracted data on this confirmation screen. However, the display process of the confirmation screen can be omitted.

The linkage-processing unit 226 outputs the extracted data to a prescribed linkage APL 21 by a prescribed linkage method based on the linkage method information contained in the screen defining information. In addition, the linkage-processing unit 226 receives the processed data from the linkage APL 21, and causes the output device 14 to display the confirmation screen of the linkage result for confirming the data. However, the display process of the confirmation screen of the linkage result can be omitted.

The item information output unit 227 outputs the data acquired as the linkage result to a prescribed area of the target APL 23 based on output method information contained in the screen defining information. In addition, the item information output unit 227 causes the output device to display the result confirmation screen for confirmation of the data linkage process. Incidentally, the output process of the data acquired as the linkage result and the display process of its confirmation screen can be omitted. As well as FIG. 2, FIG. 5 shows a case where the process result of the linkage APL 21 is returned to the target APL 23.

In the following description, details of each process are provided using FIG. 6 through FIG. 29. In the following explanation, assume that the target APL 23 is a program for financial service money transfer, and the linkage APL 21 is a seal-impression verification program. An example is a case of causing the linkage APL 21 to carry out the seal-impression verification process based on the data items extracted from the "money transfer processing" screen of the target APL 23, and returning the verification result to the target APL. The following explanation uses a specific example of money transfer processing screen. These assumptions are made to facilitate understanding by explanation of specific examples, and they are not to thus limit the target APL 23 and the linkage APL 21, nor to limit the application range of the present invention.

Figure 6:
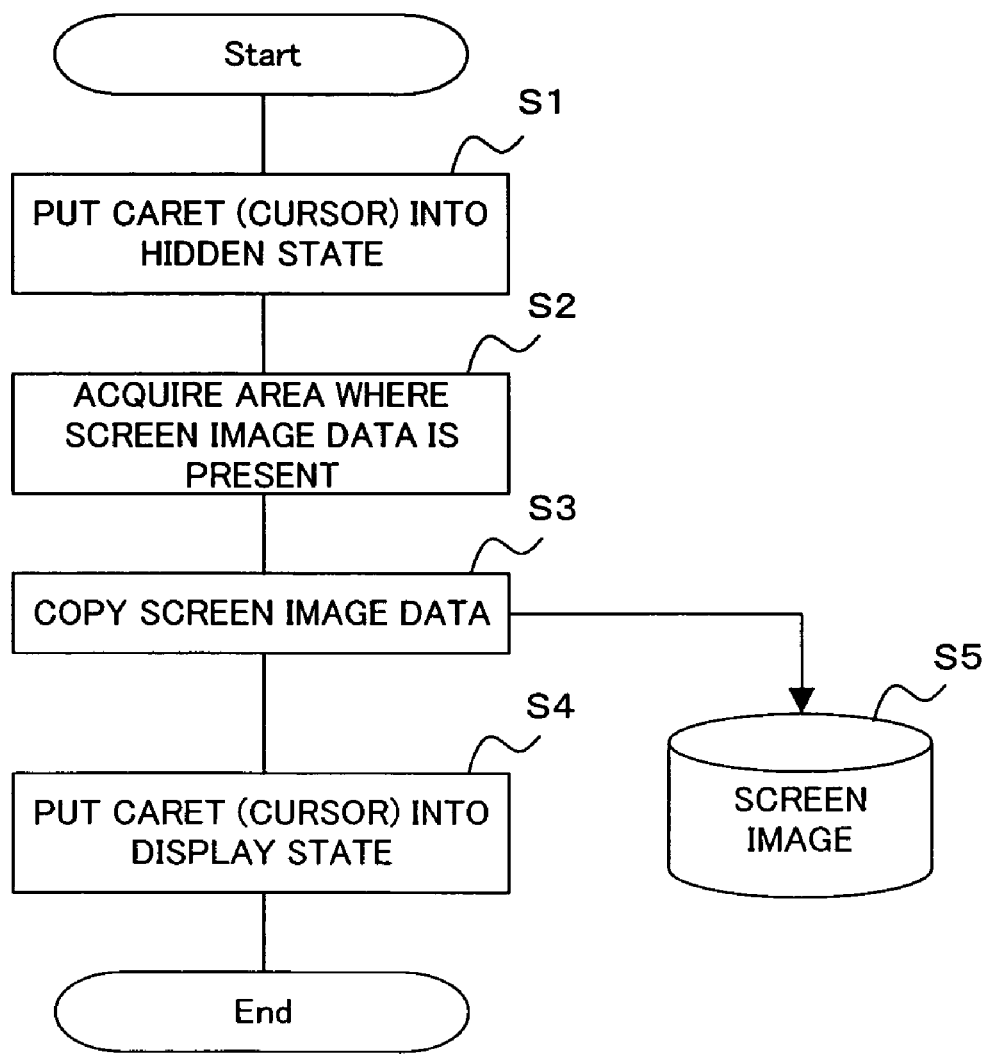
FIG. 6 is a flowchart showing procedures of a display screen retrieving process.

First, referring to FIG. 6, procedures of the display screen retrieval process are explained. As shown in FIG. 6, the display screen-retrieving unit 221 retrieves a display screen from the target APL 23, and a caret or cursor on the screen is set to a hidden state (Step S1). Next, the display screen-retrieving unit 221 acquires an area in memory, where the screen image data of the screen is present (Step S2), and copies the screen image data of the screen from the area (Step S3). Later, the display screen-retrieving unit 221 returns the caret or the cursor on the display screen back to the display state (Step S4). The display screen-retrieving unit 221 writes the copied screen image data into the screen image-writing unit 228 (Step S5).

FIG. 17 shows an example of a display screen retrieved by the display screen-retrieving unit 221. The display screen shown in FIG. 17 is displayed during money transfer processing of the financial service money transfer. In this screen, "money transfer processing" is displayed in the upper left of FIG. 17 as character information indicating the processing carried out in this screen, and additionally, "Menu 00201" is displayed in the upper right of FIG. 17 as a screen identification number. The screen identification number does not have to correspond to a screen ID set by the screen type-defining unit 222.

This screen also displays a customer database number (CIF number, CIF: Customer Interaction File), a customer name, transfer amount, a column to input the result of a seal-impression verification, and a screen image (hereinafter referred to as a retrieved seal) of the retrieved seal-impression (hereinafter referred to as a retrieved seal) from the application form for money transfer processing as transaction information.

Figure 7:
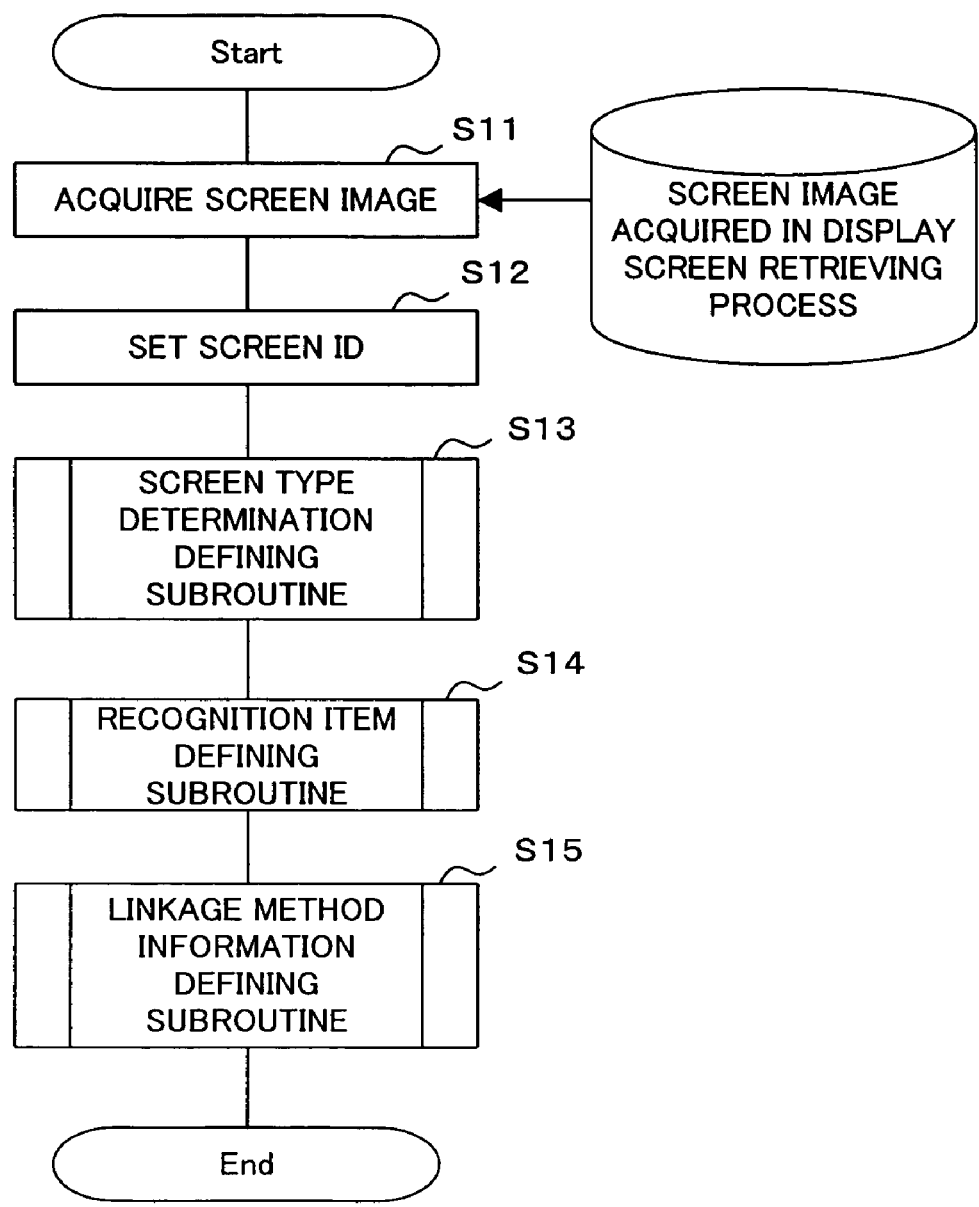
FIG. 7 is a flowchart showing procedures of a screen type defining process.

In the following description, procedures of the screen type-defining process are explained using FIG. 7 through FIG. 10 referring to the screen image data of the display screen shown in FIG. 17. The screen type-defining process is included in the screen defining process. First, as shown in FIG. 7, in the screen type-defining process, the screen type-defining unit 222 retrieves the screen image data from the screen image-writing unit 228 (Step S11). Next, the screen type-defining unit 222 sets a screen ID, which is used to identify the screen (Step S12). In addition, the screen type-defining unit 222 performs a screen type determination defining subroutine (Step S13), a recognition item defining subroutine (Step S14), and a linkage method defining subroutine (Step S15), and terminates the process. Details of each subroutine are provided later.

The screen defining information is created so as to correspond to the screen including data to be linked. The screen defining information comprises screen type determination information, recognition item information and linkage method information. When outputting the processing result by the linkage APL 21 to a prescribed application, the screen defining information further comprises output method information. The screen type determination information is created in the screen type determination defining subroutine, the recognition item defining information is created in the recognition item defining subroutine, and the linkage method information and output method information are created in the linkage method defining subroutine.

In the following description, procedures of the screen type determination defining subroutine are explained using FIG. 8 and FIG. 18. As shown in FIG. 8, the screen type-defining unit 222, when designated items to be extracted as screen type determination information from the retrieved screen, assigns an item ID to the item (Step S21). Next, the screen type-defining unit 222, when designated an area (identification section) containing the items to be extracted in the screen image displayed (Step S22), extracts image data from the screen image data based on the coordinates (Step S23). The screen type-defining unit 222 creates screen identification determining information containing the item ID, the coordinates and the extracted image data. If Step S21 through Step S23 are conducted on all items to be extracted as screen type determining information, (Step S24: Yes), the process is terminated. Otherwise (Step S24: No), the process returns to Step S21.

An example of screen type determination information of the screen shown in FIG. 17 is indicated in FIG. 18. FIG. 18 shows two kinds of screen type determining information of the screen shown in FIG. 17. One is the screen type determining information containing coordinate information indicating an area on the screen, which has the characters "money transfer processing" displayed in the upper left in FIG. 17 and the extracted image data based on the coordinate information. The other is the screen type determining information containing coordinate information indicating an area on the screen, which has the characters and numbers "Menu 00201" displayed and the extracted image data based on the coordinate information. In FIG. 18, area is indicated using coordinates of two diagonally opposed vertexes of four vertexes forming a rectangle, for example. Although the screen type determining information in FIG. 18 has "item name" instead of "item ID", either one can be used. The screen type determining information is used when identifying the retrieved screen from the target APL 23 in a data linkage process explained later.

Figure 9:
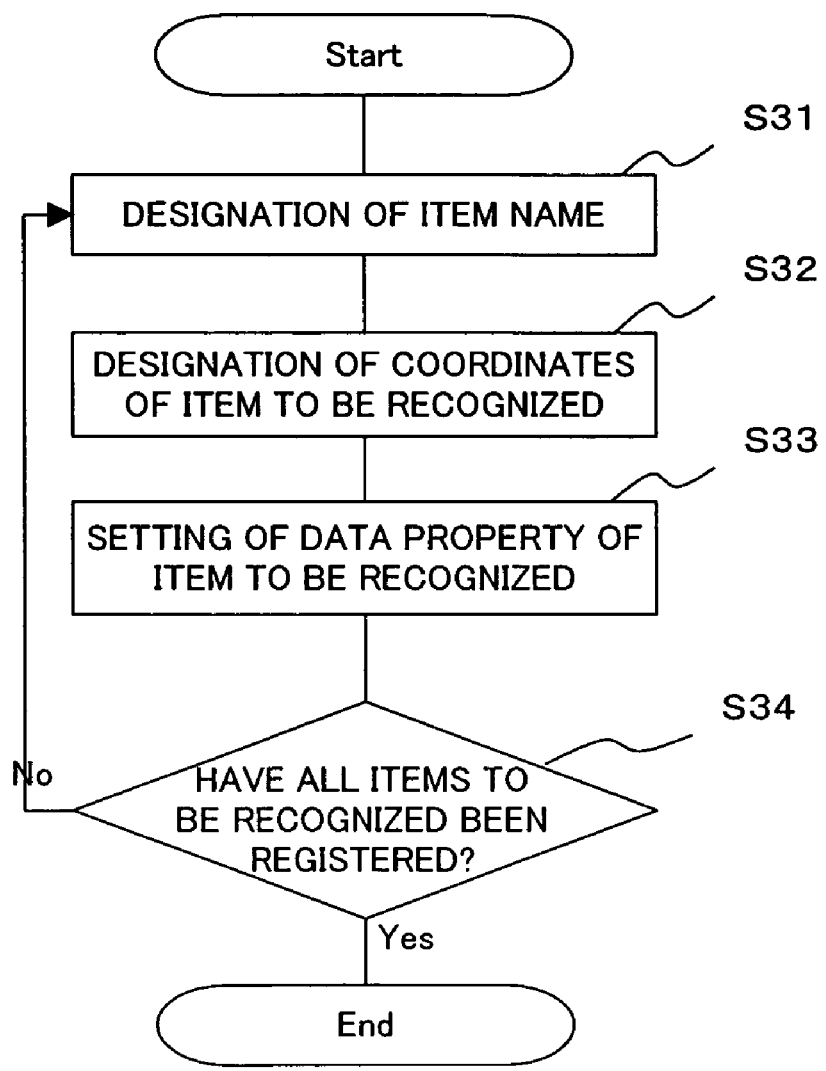
FIG. 9 is a flowchart showing procedures of recognition item defining subroutine.

Next, using FIG. 9 and FIG. 19, procedures of the recognition item defining subroutine are explained. As shown in FIG. 9, the screen type-defining unit 222 is designated item names of data to be extracted as recognition items from the screen retrieved by the display screen-retrieving unit 221. These item names may correspond to an item name on the screen (Step S31). Then, the screen type-defining unit 222 is designated the area, in which the recognition items are displayed, within the screen (Step S32). Additionally, the screen type-defining unit 222 is designated a property of the data displayed in the area (Step S33). The screen type-defining unit 222, based on the designations of Step 31 through Step 33, creates the recognition item information, which comprises the item name, coordinate information indicating the designated area, and the data property information containing data properties. Character data, edit control, static control, and image data can be used, for example, as data property. If Step S31 through Step S33 are conducted on all items to be extracted as recognition items, (Step S34: Yes), the process is terminated. Otherwise (Step S34: No), the process returns to Step S31. The recognition item information is used when extracting the data to be linked to the linkage APL 21 from the retrieved screen from the target APL 23 in the data linkage process explained later.

An example of recognition item information of the screen shown in FIG. 17 is indicated in FIG. 19. As in FIG. 19, there are four kinds of recognition item information on the screen shown in FIG. 17. A first one is recognition item information corresponding to an input column of the CIF number, a second one is recognition item information corresponding to an input column of a customer name, a third one is recognition item information corresponding to an input column of an amount of money to transfer, and a fourth one is recognition item information corresponding to an input column of a screen image of a retrieved seal. As shown in FIG. 19, also, each item of the recognition item information contains the item name, the coordinate information indicating an area in which the item is displayed on the screen, and the data property information of the item. In the same way as FIG. 18, the area is indicated using two diagonally opposed vertexes of the vertexes forming a rectangle in FIG. 19.

Next, using FIG. 10, FIG. 20 and FIG. 21, procedures of the linkage method defining subroutine are explained. As in FIG. 10, first, the screen type-defining unit 222 is designated the linkage APL 21 and linkage method (Step S41). The screen type-defining unit 222, according to the designation, creates linkage method information containing linkage destination identifying information identifying the linkage APL 21 and linkage method designating information designating the linkage method. As linkage methods, for example, TCP/IP (Transmission Control Protocol/Internet Protocol), HTTP (Hypertext Transmission Protocol), API (Application Program Interface), and DLL (Dynamic Link Library) can be used.

FIG. 20 shows an example of linkage method information. In the example shown in FIG. 20, the linkage method information contains the program name of the linkage APL 21 as linkage destination identifying information identifying the linkage APL. As a data linkage method between the linkage APL 21 and the target APL 23, TCP/IP and socket communication are designated.

Next, the screen type-defining unit 222 receives information designating whether or not information, acquired as a result that the linkage APL processed the linked data (hereinafter referred to as linkage result information), is output to the target APL 23 from the linkage APL 21 (Step S42). Based on the designation, when it is determined to output the linkage result information to the target APL 23, (Step S42: Yes), the process proceeds to Step S43. Otherwise (Step S42: No), the process returns to Step S46.

When the determination of Step S42 is "Yes", in Step S43, the screen type-defining unit 222 creates output method information comprising the item names of the linkage result information and the coordinate information indicating the output destination area on the screen in which the linkage result information is displayed (Steps S43 and S44) based on the user's designation. When outputting a plurality of items as linkage result information, a plurality of output method information corresponding to each item are created.

The screen type-defining unit 222, if Step S41 through Step S43 has been conducted on all items to output the linkage result information, (Step S45: Yes), terminates the process. Otherwise (Step S45: No), the process returns to Step S43. The output method information is used when outputting the linkage result information on the screen of the target APL 23 in the data linkage process explained later.

When the result of Step S42 is "No", the output result information does not have to be created in Step S46, and therefore the processing is terminated.

FIG. 21 shows an example of the output method information. As shown in FIG. 21, the output method information comprises the item name of the linkage result information and coordinate information indicating an output destination area on the screen to display the linkage result information. Because the number of items output as the linkage result information is one in FIG. 21, the number of the output method information to be created is also one. Based on the output method information, the linkage result information is displayed in the input column of the verification result on the screen shown in FIG. 17.

Figure 11:
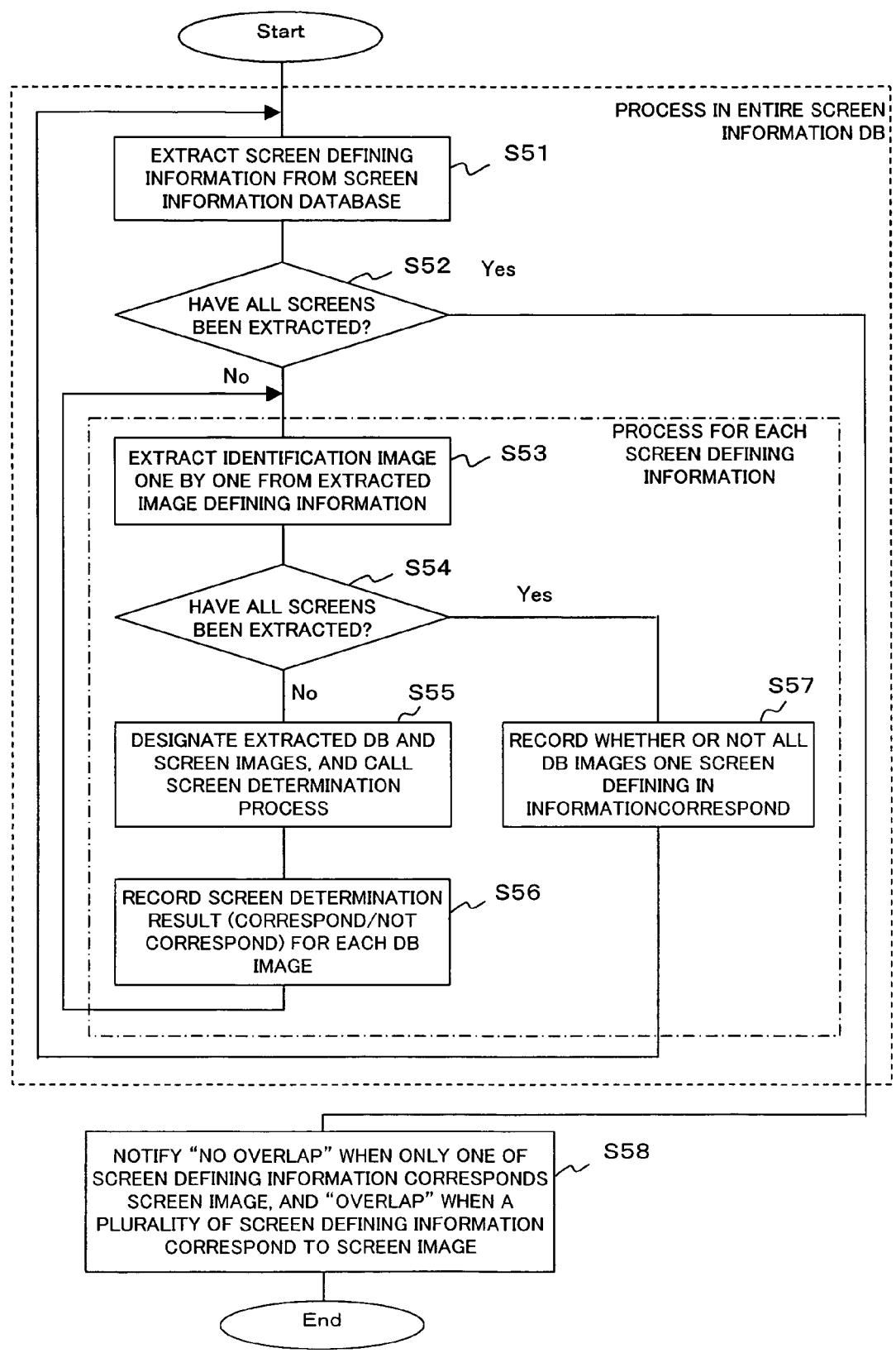
FIG. 11 is a flowchart showing procedures of a definition overlap check process.

The screen defining information created in the above screen type defining process is written into the screen information DB 229. And in the definition overlap check process, whether or not the created screen defining information overlaps with the screen defining information created earlier is confirmed. This definition overlap check process is included in the screen defining process. The procedures of definition overlap confirmation process are explained in the followings, using FIG. 11. As FIG. 11 shows, first, the definition overlap check unit 223 retrieves the screen defining information, which has not yet been processed by the overlap check process, from the screen information DB 229 (Step S51). When all the screen defining information in the screen information DB 229 has been processed by the overlap check process (Step S52: Yes), the process proceeds to Step S58. Otherwise (Step S52: No), Step S53 and following processes are conducted.

One or more of the screen type determining information is contained in the screen defining information. Coordinate information indicating an area on the screen and image data is included in each of the screen type determination information. In Step S53, the definition overlap check unit 223 acquires image data from the screen type determination information, which has not been processed by the overlap check process, based on the screen defining information retrieved in Step S51. When all the screen type determination information in the screen determination information retrieved in Step S51 have been processed by the overlap check process (Step S54: Yes), the process proceeds to Step S57. Otherwise (Step S54: No), Step S55 and Step S56 are conducted.

In Step S55, the definition overlap check unit 223 extracts image data from the screen image data written in the screen image-writing unit 228 based on the coordinate information corresponding to the image data acquired in Step S53. The definition overlap check unit 223 compares the image data acquired in Step S53 with the extracted image data, and, based on the comparison result of the image data, whether or not they match each other is determined. Details of the processes of the image comparison are explained later as an image comparison subroutine. The definition overlap check unit 223 records the determination result of the image data acquired in Step S53 in a temporary record storage area (Step S56), and the process returns to Step S53.

In Step S57, the definition overlap check unit 223 determines whether or not the determination result stored in the temporary record storage area indicates "corresponding in all determinations", stores the determination result of the screen defining information retrieved in Step S51 in the temporary record storage area as "corresponding", and the process returns to Step S53.

In Step S58, the definition overlap check unit 223 counts the number of screen defining information with determination results of "corresponding or matching". In addition, the definition overlap check unit 223 determines "no overlap" when the above result is "1", and determines "overlap" when the above result is "2 or over". The definition overlap check unit 223 notifies users of the determination result, and terminates the process.

In the above process, it is the case that the definition overlap check process is conducted every time the screen defining information is created. However, it is also possible that the definition overlap check process is conducted after creating the screen defining information of all screens to be defined and writing it into the screen information DB 229, and then whether or not the screen defining information overlaps with the screen information DB 229 stored is determined.

Figure 12:
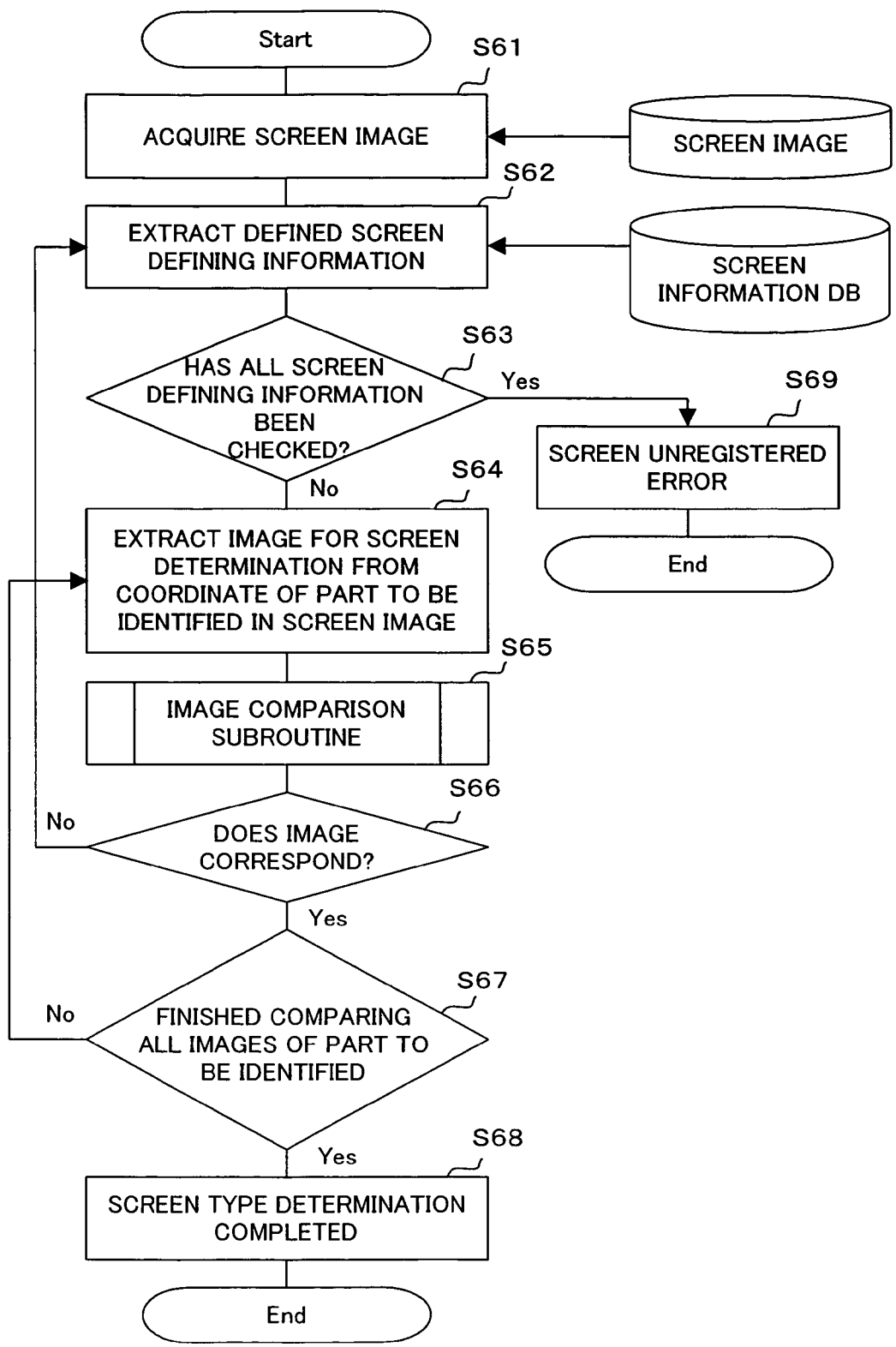
FIG. 12 is a flowchart showing procedures of a screen type determination process.

In the following description, using FIG. 12 and FIG. 22, procedures of the screen type determination process are explained. The screen type determination process is included in the data linkage process. First, prior to the screen type determination process, the display screen retrieval process is carried out as it is explained using FIG. 6. Then, the screen type determination unit 224 acquires screen image data from the screen image-writing unit 228 (Step S61), and also extracts one of the screen defining information items, which has not been processed by the screen type determination process, from the screen information DB 229 (Step S62).

When the screen type determination process has already been conducted on all screen defining information items in the screen information DB 229 (Step S63: Yes), the process proceeds to Step S69. Otherwise (Step S64: No), Step S64 and following processes are conducted.

One or more of the screen type determination information items is contained in the screen defining information, and coordinate information indicating an area of the screen image data and image data are included in each of the screen type determination information items. Step S64 through Step S66 are carried out on all screen type determination information items included in the screen defining information acquired in Step S62.

In Step S64, the screen type determination unit 224 acquires one of the screen type determination information items from the screen defining information acquired in Step S62. In addition, the screen type determination unit 224 extracts image data from the screen image data acquired in Step S61 based on the coordinate information in the screen type determination information.

In the following description, using FIG. 22, an area extracted from the screen image is explained.

In FIG. 22, the areas, expressed by coordinates in the screen type determination information shown in FIG. 18, are indicated by arrows. As FIG. 22 shows, from the screen image data, the area displaying characters "Money transfer process" and the area displaying screen identification number "Menu 00201" are extracted based on the screen type determination information shown in FIG. 18 for the screen type determination process.

The screen type determination unit 224 carries out an image comparison subroutine comparing the image data in the screen type determination information acquired in Step S64 with the image data extracted from the screen image data (Step S65). Details of the image comparison subroutine are provided later.

Next, the screen type determination unit 224, based on the result of the image comparison subroutine, determines whether or not the image data included in the screen type determination information and image data extracted in Step S64 correspond (Step S66). If they do not correspond (Step S66: No), the process returns to Step 62. If they do correspond (Step S66: Yes), the process proceeds to Step S67.

In Step S67, the screen type determination unit 224 determines whether or not Step S64 through Step S66 have been conducted on all the screen type determination information in the screen defining information acquired in Step S62. When Step S64 through Step S66 have been conducted on all the screen type determination information (Step S67: Yes), the process proceeds to Step S68. Otherwise, (Step S67: No), the process returns to Step S64.

In Step S68, the screen type determination unit 224 determines that the screen defining information acquired in Step S62 corresponds to the screen image data acquired in Step S61 (Step S68), and terminates the process.

In Step S69, the screen type determination unit 224 determines that screen defining information corresponding to screen image data acquired in Step S61 is not stored in the screen information DB 229. The screen type determination unit 224 notifies users that a processing error has occurred because the retrieved image is not registered in database, and terminates the process.

Figure 13:
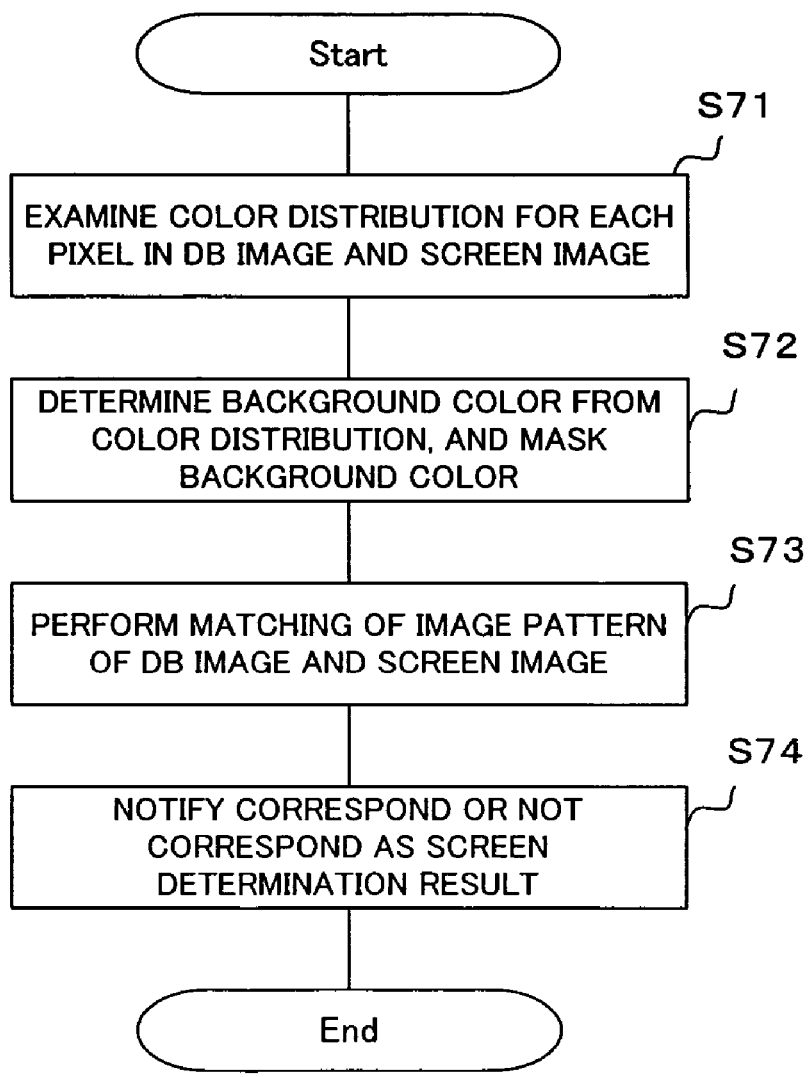
FIG. 13 is a flowchart showing procedures of image comparison subroutine.

In the following description, procedures of the image comparison subroutine are explained using FIG. 13 and FIG. 23. As FIG. 13 shows, the screen type determination unit 224 detects the distribution of colors in every pixel of the image data in the screen type determination information acquired in Step S64 and the image data extracted from the screen image data (Step S71). Next, the screen type determination unit 224 determines a background color based on the color distribution of each of the image data in the screen type determination information and the image data extracted from the screen image data, and masks the color (Step S72).

In addition, the screen type determination unit 224 compares the image pattern of an unmasked part in the image data in the screen type determination information and the image pattern of an unmasked part in the image data extracted from the screen image data, and performs matching of the two (Step S73). The matching result is used in determination in the above Step S66 (Step S74).

In the following description, a part to be masked during the image comparison subroutine is explained using FIG. 23.

FIG. 23 shows two image data contained in the screen type determination information shown in FIG. 18, and the extracted image data based on the coordinate contained in each of the screen type determination information. For example, two image data with their item names being "process name" display characters "Money transfer process". In these image data, the shaded part is determined as the background color, and is masked. As a result, in both of the image data, the screen pattern displaying characters "Money transfer process" remains unmasked, and they are compared to each other by the screen type determination unit 224.

Figure 14:
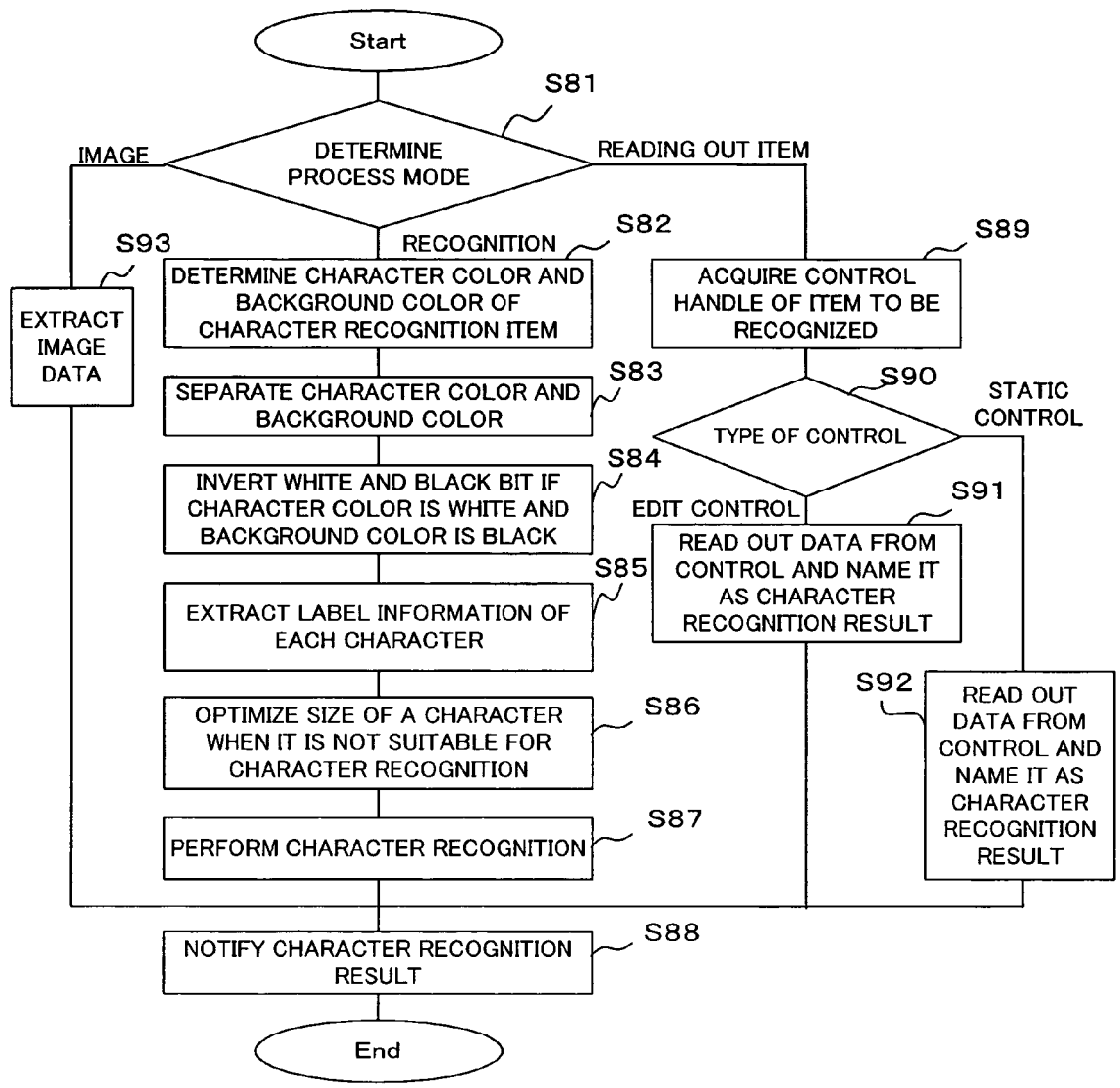
FIG. 14 is a flowchart showing procedures of an item information acquisition/recognition process.

Next, using FIG. 14 and FIG. 24, procedures of the item information acquisition/recognition process are explained. The item information acquisition/recognition process is included in the data linkage process. The screen defining information contains one or more recognition item information items. The following Steps S81 through S93 are carried out on each of the recognition item information contained in the screen defining information corresponding to the screen image data acquired in Step S61.

First, the item information acquisition/recognition unit 225 acquires one of the recognition item information from the screen defining information, and determines a processing mode of the item recognition based on the information indicating data properties contained in the recognition item information (Step S81). For example, when the data property shows "character data", the item information acquisition/ recognition unit 225 determines the process mode as that of character recognition using OCR (Optical Character Reader) etc. (Step S81: recognition), and the process proceeds to Step S82. When the data property shows "edit control" or "static control", the item information acquisition/recognition unit 225 determines the process mode as that of reading out the data item (Step S81: reading out item), and the process proceeds to Step S89. When the data property shows "image data" (Step S81: image), the process proceeds to Step S93.

In Step S82, the item information acquisition/recognition 225 extracts image data from the retrieved screen image data based on coordinate information contained in the recognition item information, and judges the color showing characters and the color showing background by scanning every pixel constituting the image data and determining the color (Step S82).

Next, the item information acquisition/recognition unit 225 separates the color showing characters and the color showing background (Step S83) by binarizing the image data using a threshold, which separates the background image and the characters. When the color showing characters become white and the color showing background image becomes black by binarization, the item information acquisition/recognition 225 inverts the value (bit) of each pixel showing the color of each of them (Step S84).

Additionally, the item information acquisition/recognition unit 225, by acquiring a group of successive black pixels (label information) extracts label information for each character (Step S85). The item information acquisition/recognition unit 225 determines the size of a character based on the result, from which label information is extracted, and when the size of the character is not suitable for the character recognition process, the character is increased or reduced in size so as to be suitable in size for the process (Step S86).

Next, the item information acquisition/recognition unit 225 carries out character recognition (Step S87), and notifies users of the recognition result. When two or more of the recognition item information are contained in the screen defining information, it is also possible to notify users of the recognition result by displaying a confirmation screen after terminating the recognition process of all recognition recognition item information.

In Step S89, the item information acquisition/recognition unit 225 acquires the control handle of the data item to be recognized, based on the coordinates contained in the recognized item information. Moreover, based on the information showing the data property contained in the recognition item information, the item information acquisition/recognition unit 225 determines whether the control is edit control or static control (Step S90).

When the control is edit control (Step S90: edit control), the item information acquisition/recognition unit 225 reads out data from the control and acquires as a recognition result using a class member function GetLine( ), for example, (Step S91), and the process proceeds to Step S88. When the control is static control (Step S90: static control), the item information acquisition/recognition unit 225 reads out data from the control and acquires as a recognition result using a class member function GetText( ), for example, (Step S92), and the process proceeds to Step S88.

In Step S93, the item information acquisition/recognition unit 225, based on coordinate information contained in the recognition item information, extracts image data from the screen image data, and the process proceeds to Step S88.

In the following description, using FIG. 24, a process to extract and to recognize the data to be linked in the screen image data is explained.

Figure 25:
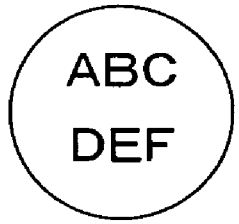
FIG. 25 illustrates recognition items acquired from a screen in FIG. 24 based on the recognized item information in FIG. 19.

FIG. 24 shows four recognition items in the screen image data to be extracted on the basis of four pieces of recognition item information shown in FIG. 19. For example, a recognition item with item name "CIF number" is extracted as image data from graphic image data, and is acquired as character data through a character recognition process. Also, for example, a recognition item with the item name "customer name" and a recognition item with the item name "amount of transfer" are acquired directly from an input column in the graphic image data as data. The recognition item with its item name "retrieved seal" is extracted from the graphic image data as image data, and acquired without any processing. In FIG. 24, a specific class member function is described, however it is just an example. FIG. 25 shows recognition items acquired from the screen in FIG. 24 based on the recognition item information shown in FIG. 19.

FIG. 26 shows an example of the confirmation screen of the recognition items acquired from the screen in FIG. 24. In FIG. 26, the recognition items other than the recognition items with data property of "image data" are extracted from the screen image data, and are displayed so that the data, which has not been processed by the recognition process, can be compared with the data acquired as a result of the recognition process. In FIG. 26, for each recognition item, the data extracted and unprocessed by the recognition process is displayed in the upper column, and the data acquired as a result of the recognition process is displayed in the lower column.

For the recognition item with data property "image data", the image data extracted from the screen image data is displayed. Users determine whether or not the recognition process is properly carried out according to this confirmation screen, and modify the recognition result as needed. As a result of confirmation and modification, when it has been determined that the data linkage process can be carried out, users press a "start linkage" button shown in FIG. 26. By so doing, the linkage process is started with output of the recognition result from the item information acquisition/recognition unit 225 to the linkage-processing unit 226. The notification of the recognition result to users and display of the confirmation screen can be omitted.

Procedures of the linkage process are explained using FIG. 15. The linkage process is included in the data linkage process. As shown in FIG. 15, the linkage-processing unit 226 receives the recognition result from the item information acquisition/recognition unit 225 as data to be linked (Step S101). And the linkage-processing unit 226 receives linkage method information from the screen defining information corresponding to the extracted screen image data (Step S102).

The linkage method information contains linkage destination identifying information identifying the linkage APL 21, which is the output destination of the data to be linked, and linkage method specifying information specifying the linkage method. The linkage-processing unit 226 outputs data to be linked to a specified linkage APL 21 by a specified linkage method based on the linkage method information (Step S103). As a response, the linkage-processing unit 226 receives the processed data (linkage result information) from the linkage APL 21, and outputs the confirmation screen of the result of the linkage process (Step S104). Then, the process is terminated. The output of the confirmation of the linkage process result can be omitted.

In the following description, a process, performed by a seal-impression verification program assumed as the linkage APL 21 in this description, is explained, using FIG. 27 and FIG. 28. As described above, four items "CIF number", "customer name", "transfer amount" and "retrieved seal" are acquired from a screen of the financial service money transfer program, which is the target APL 23, and are output in the linkage APL 21. The linkage APL 21 acquires the graphic image of registered seal corresponding to the CIF number and the customer name from a database, not shown in figures, recording the registered seals, and determines whether the graphic image of the registered seal and that of the retrieved seal acquired from the target APL 23 correspond or not. An explanation of details of the verification process of seals is omitted.

FIG. 27 illustrates an example of a screen showing the result of the seal verification process by the linkage APL 21. In the screen shown in FIG. 27, a CIF number acquired from the screen of the target APL 23, the graphic image of a customer name and a retrieved seal, and the graphic image of a registered seal acquired from a DB are displayed. Additionally, on the screen, an image of two overlapped graphic images is displayed as a verification result. According to the screen shown in FIG. 27, as a result of the seal verification, it is determined that the graphic image of the retrieved seal corresponds with that of the registered seal.

FIG. 28 describes an example of the confirmation screen of the linkage process result. FIG. 28 shows the confirmation screen when it is determined that the graphic image of the retrieved seal corresponds with that of the registered seal as a result of the linkage process. Users determine whether or not the linkage process is properly carried out based on the confirmation screen, and when the linkage process is properly carried out, they can command execution of the following process by pressing the "continue processing" button.

In the following, procedures of the item information output process are explained using FIG. 16 and FIG. 29. The item information output process is carried out when it is required that the linkage result information is output to the target APL 23. If it is not required that the linkage result information is output to the target APL 23, the process can be omitted.

Figure 16:
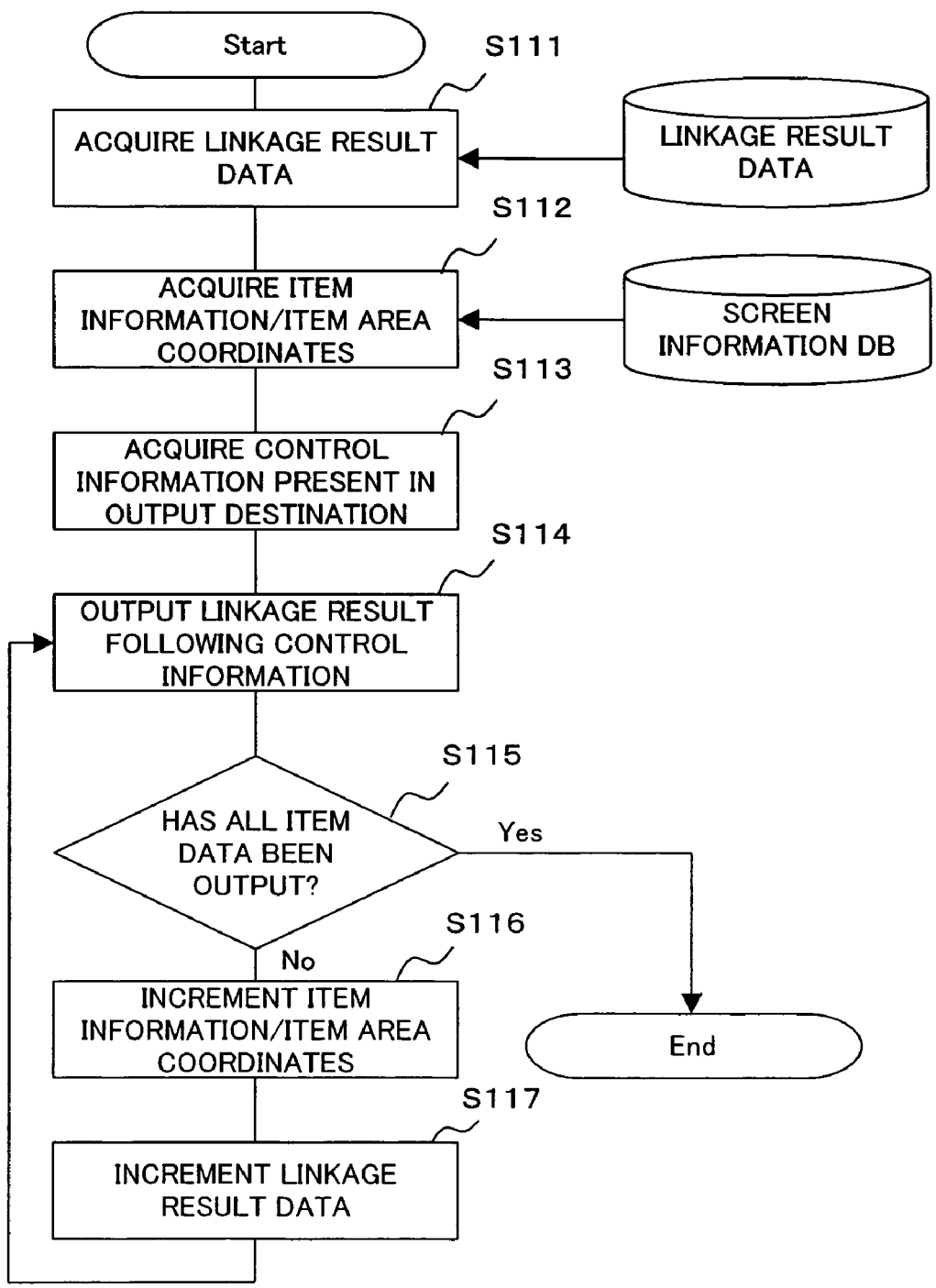
FIG. 16 is a flowchart showing procedures of an item information output process.

First, as shown in FIG. 16, the item information output 227 receives the linkage result information from the linkage-processing unit 226 (Step S111), and acquires the output method information from the screen defining information corresponding to the screen, which is currently processed (Step S112). The screen defining information contains one or more of the output method information items, and each of the output method information items contains an item name of the linkage result information and coordinate information indicating the output destination area of the screen to display the linkage result information.

The following process is carried out for each of the output method information.

First, the item information output unit 227 takes one of the output method information items, and, based on coordinate information contained in the output method information, acquires control information of the output destination area from the screen data of the screen to be output destination in the target APL 23 (Step S113). Based on the control information, the item information output unit 227 makes the output destination area in the screen display the linkage result information (Step S114).

Furthermore, the item information output unit 227 determines whether or not the output process of all output method information is completed (Step S115). When the output process of all output method information is not completed (Step S115: No), the item information output unit 227 increments the number of output method information items, processed by the output process, by 1, and loads one of the unprocessed output method information items (Step S116). Moreover, the item information output unit 227 extracts the items, which have not yet been processed by the output process, from the linkage result information (Step S117), and the process returns to Step S114.

When the count number becomes equal to the total number of output method information items, the item information output unit 227 determines that the output process is completed for all output method information (Step S115: Yes), and terminates the process.

Figure 29:
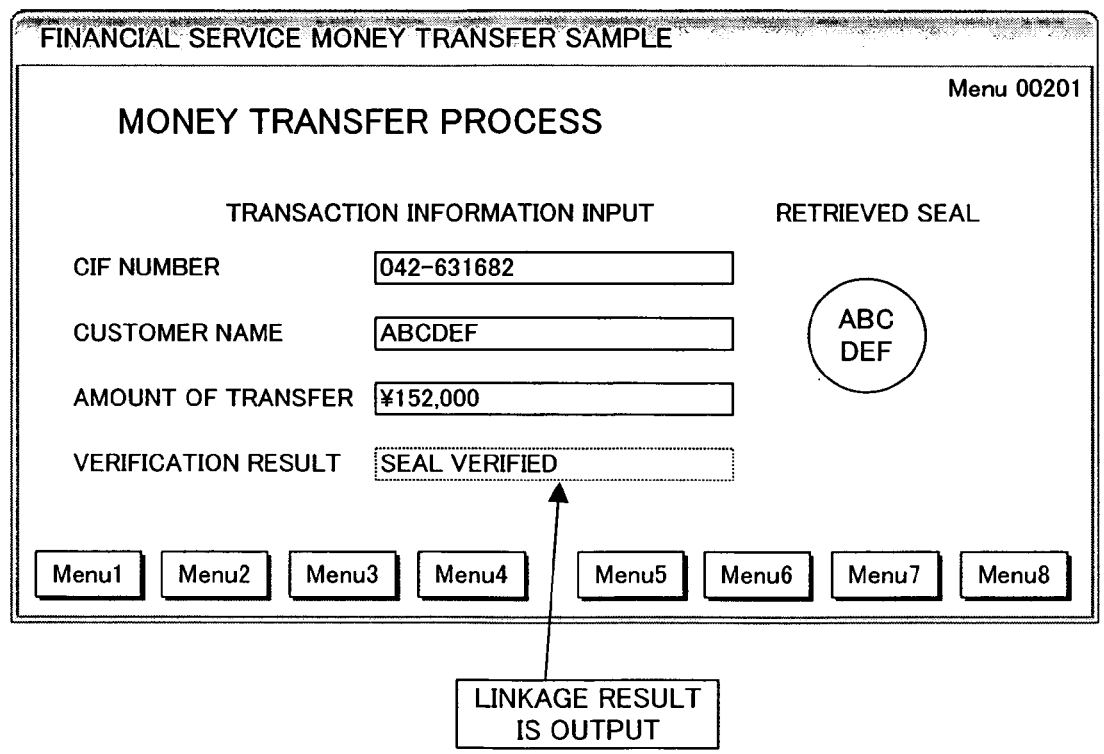
FIG. 29 illustrates an example of a screen outputting the linkage result information on the screen of the target APL.

FIG. 29 shows an example of an output screen of the linkage result information on the screen of the target APL 23. In FIG. 29, "seal verified" is output as linkage result information in the input column titled "verification result".

Next, an example of a variation of the first embodiment is explained. The first embodiment was explained such that data to be linked is captured from the screen of target APL 23, and the extracted data is output to the linkage APL 21. However, it is also possible to identify the screen of the target APL 23, and to make the identified screen output the data processed in the linkage APL 21 as the data to be linked. Such a case is set forth in the following description.

According to this variation, the screen of the target APL 23 is identified, however it is not necessary to take out the data to be linked from the screen, and the data does not have to be output to the linkage APL 21. Consequently, the first embodiment and the variation of the first embodiment differ in the following points.

According to the variation of the first embodiment, the screen plug 22 does not have to comprise the item information acquisition/recognition unit 225. Thus, the screen plug 22, relating to the variation of the first embodiment, can have a configuration like the one in the functional configuration diagram in FIG. 3 except for the item information acquisition/recognition unit 225

According to the variation of the first embodiment, the screen defining information does not contain recognition item information According to the variation of the first embodiment, the screen type-defining unit 222 does not carry out the recognition item defining subroutine in the screen type defining process According to the variation of the first embodiment, the item information acquisition/recognition process is not performed in the data linkage process In the following description, an overview of the data linkage process in the variation of the first embodiment is explained using FIG. 30. Because each process has been already explained in the first embodiment, here, an explanation of details of each process are omitted.

Figure 30:
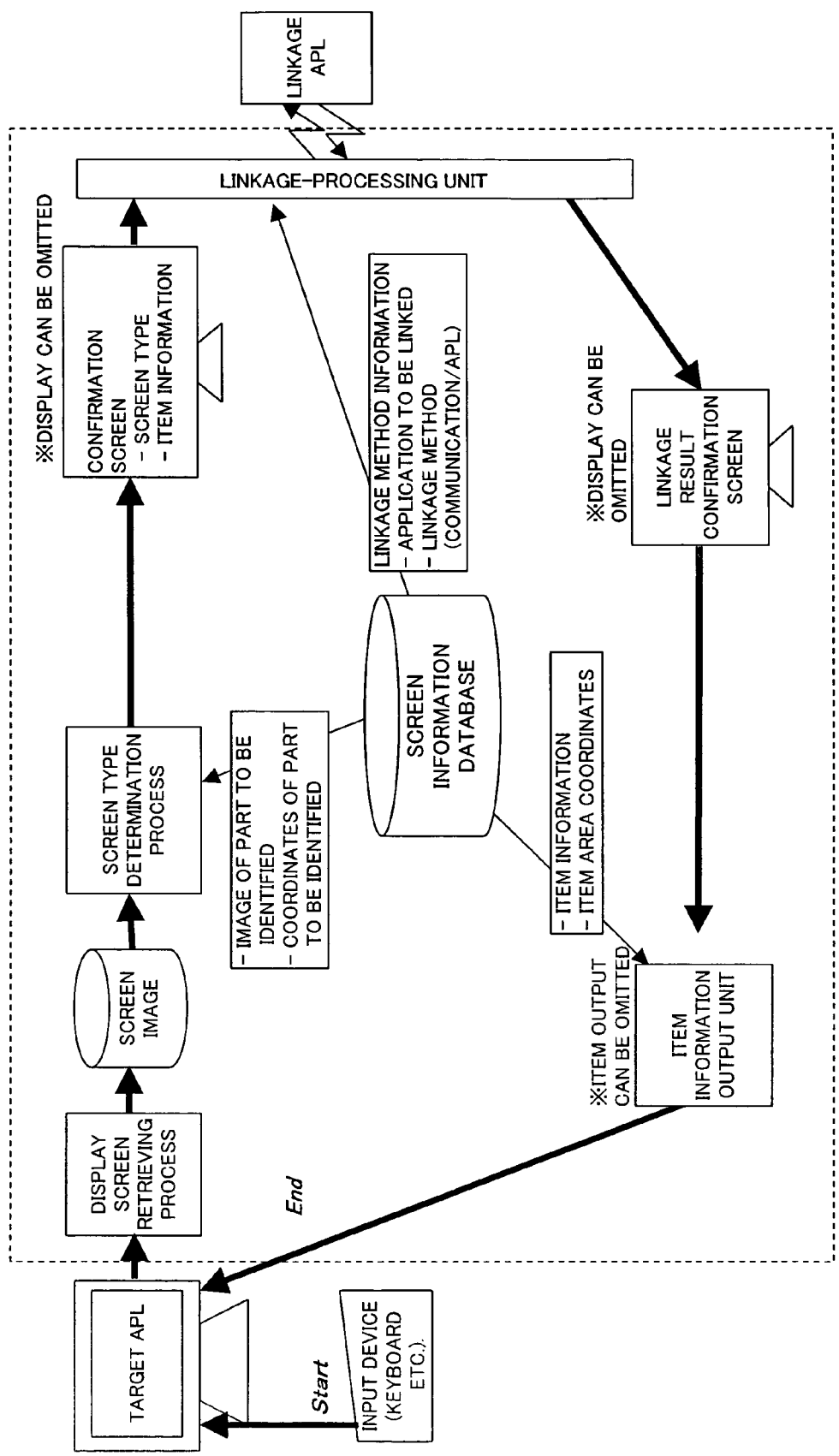
FIG. 30 explains an overview of the data linkage process in a variation of the first embodiment.

As shown in FIG. 30, according to the variation of the first embodiment, when the data linkage process is started upon input from the input device 13 such as keyboard, the display screen-retrieving unit 221, first, carries out the display screen retrieval process taking in the display screen from the target APL 23. Screen image data of the retrieved display screen is written into the screen image-writing unit 228. The screen type determination unit 224 reads out the screen defining information from the screen information DB 229, and identifies the screen in which screen image data is written in the screen image-writing unit 228 based on the screen defining information. The screen type determination unit 224 causes the output device 14 to display the confirmation screen for confirming the recognition result of the screen. Users can confirm the extracted data from this confirmation screen. The display process of this confirmation screen can be skipped. The linkage-processing unit 226 receives processed data from a designated linkage APL 21 by a designated linkage method based on the linkage method information, and causes the output device 14 to display the confirmation screen of the linkage result for confirming the data. This display process of the linkage result confirmation screen can be omitted. The item information output unit 227 outputs the acquired data to a designated area in the target APL 23 based on the output method information contained in the screen defining information. In addition, the item information output unit 227 causes the output device 14 to display the result confirmation screen for confirmation of the result of the data linkage process. However, the display process of the confirmation screen can be omitted. As explained above, in the variation of the first embodiment, which differs from the first embodiment, the item information acquisition/recognition process for acquiring information from the screen of the target APL 23 is not carried out. The difference between these two is clearly understood from the comparison between FIG. 5 and FIG. 30.

In the following description, details of the variation of the first embodiment are set forth under the assumption that the target APL 23 is a program for financial service money transfer and the linkage APL 21 is a program for document processing and seal verification. The linkage APL 21 reads a deposit slip indicating an account number and transfer amount and seal impression to be retrieved, using a scanner. And it extracts a graphic image of the read seal from the acquired graphic image, and recognizes the account number and the transfer amount as character data. In addition, the linkage APL 21 acquires a CIF number, a customer name and a graphic image of a registered seal, corresponding to the account number from a DB, not shown in figures, and verifies the seal based on the graphic image of the retrieved seal and that of the registered seal.

Meanwhile, the screen plug 22 recognizes "money transfer process" of the target APL 23, receives the CIF number, the customer name, the transfer amount, the verification result and the graphic image of the retrieved seal from the linkage APL 21, and causes the recognized screen to output the received information. An example of the "money transfer process" screen is described in FIG. 17. In the variation of the first embodiment, each input column of "CIF number", "customer name", "transfer amount", "verification result" and "retrieved seal" on the "money transfer process" screen of the target APL 23 is "blank" at first, and the screen plug 22 causes the screen to output the process data by the linkage APL 21.

By so doing, it is possible to read the deposit slip as graphic data using a scanner, and to provide the process result, acquired by the linkage APL with a function to acquire necessary information from the graphic data, to the target APL 23 without such a function. Consequently, it is possible to incorporate a new function to the target APL 23 without modifying the target APL 23.

The above assumptions are to facilitate the understanding of the description by making the explanation specific, and they should not be construed as limiting the target APL 23 and the linkage APL 21 or as limiting the application of the present invention. Next, a further variation of the first embodiment is explained. In the first embodiment, the target APL 23 and the linkage APL 21 are installed in a single computer, they can however, be installed in separate computers. In such a case, the screen plug 22 is comprised in the computer in which the target APL 23 is installed. The procedures of the processes are the same as explained above.

In the above, as explained the linkage result information is output on the same screen as the one from which the data to be linked is extracted from the target APL 23, however it can be output on a different screen from the one from which the data to be linked is extracted from the target APL 23. In this case, the screen to output the linkage result information to must be defined in advance.

The linkage result information, also, can be output to a third program other than the target APL 23. In such a case, the output method information is to further contain information to identify the third program. The linkage result information can be processed in the program.

Next, an explanation of second embodiment is provided below. In the first embodiment, the explanation is provided that the data extracted from the target APL 23 is output to the linkage APL 21 and processed by linkage process, and the linkage process result is returned to the target APL 23. In this instance, the data is output in the direction from the target APL 23 to the linkage APL 21. In the second embodiment, a configuration, which allows the target APL and the linkage APL to obtain the data in both directions and to be linked together, is explained.

Figure 31:
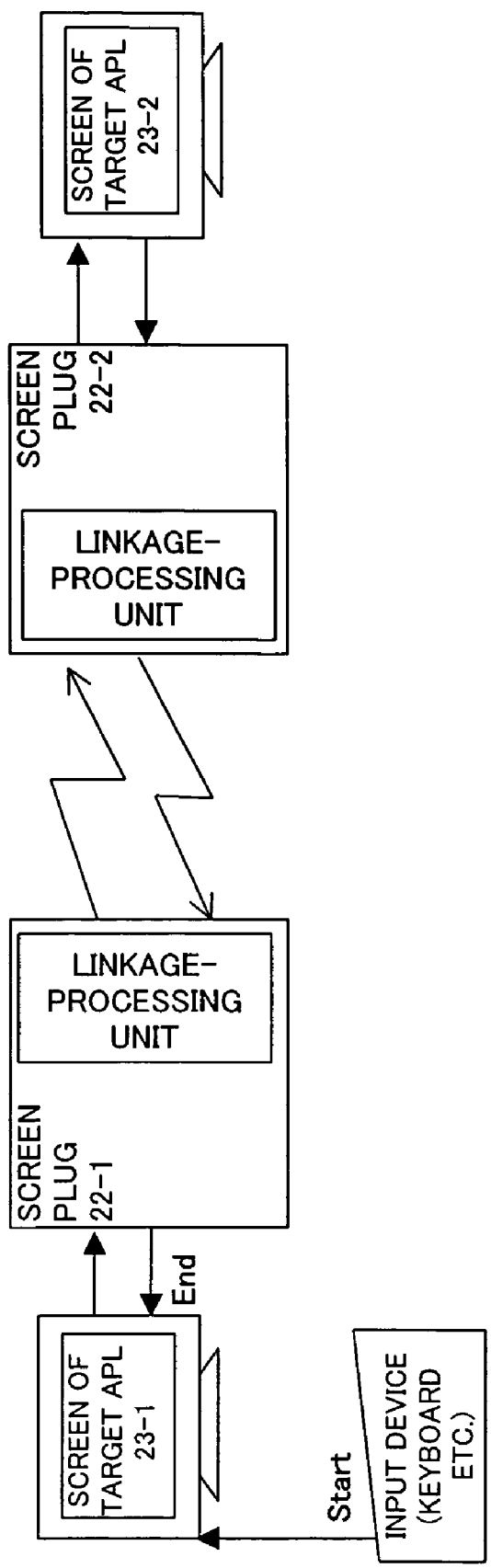
FIG. 31 shows a configuration of a system relating to the second embodiment.

FIG. 31 describes a configuration of a system relating to the second embodiment. As shown in FIG. 31, a target APL 23-1 and a target APL 23-2 are installed in a computer. A screen plug 22-1 captures the data to be linked from the screen of the target APL 23-1, and outputs the data to the target APL 23-2. In response, the screen plug 22-1 receives the result of the linkage process from the target APL 23-2 and outputs it to the target APL 23-1. On the other hand, a screen plug 22-2 captures the data to be linked from the screen of the target APL 23-2, and outputs the data to the target APL 23-1. In response, the screen plug 22-2 receives the result of the linkage process from the target APL 23-1 and outputs it to the target APL

23-2. In other words, the target APL 23-2 is a linkage APL of the target APL 23-1, and the target APL 23-1 is a linkage APL of the target APL 23-2. Consequently, it is possible to link the data in both directions between two programs. In this case, also, neither program is required to be modified for data linkage.

In the same way as the variation of the first embodiment, the target APL 23-1 and the target APL 23-2 can be installed in two separate computers. In such a case, the target APL 23-1 and the screen plug 22-1 are installed in one computer, and the target APL 23-2 and the screen plug 22-2 are installed in the other computer.

In the description above, the embodiments of the present invention are set forth, however the present invention is not to be limited to the above embodiments, but is to be construed as embodying all various modifications.

As described above, according to a data linkage technology relating to the present invention, the effect that information displayed on the display screen of an existing application can be used in a different application without modifying the existing application can be achieved. Furthermore, as another effect, elimination of output of data on paper media and input operation by manual effort can be achieved.

As explained above, the data linkage technology relating to the present invention is useful in systems, which perform processing using a computer.

What is claimed is:

1. A data linkage supporting method, in which a computer supports data linkage between application programs, comprising:

capturing, from a primary application program, screen image data of a display screen where one or more pieces of data are displayed respectively corresponding to one or more items;

extracting, from the screen image data, one or more pieces of image data respectively displayed in one or more predefined particular areas in the display screen based on screen type determination information predefined for each type of a screen, where the screen type determination information is predefined so as to include respective one or more pieces of coordinate information to indicate the one or more predefined particular areas and respective one or more pieces of image data to be displayed in the one or more predefined particular areas;

determining for each of the one or more predefined particular areas, a first background color based on a distribution of color in every pixel of a piece of the image data extracted from the predefined particular area concerned and a second background color based on a distribution of color in every pixel of a predefined piece of the image data comprised in the screen type determination information corresponding to the predefined particular area concerned stored in a screen information database;

masking the first background color and the second background color;

determining whether or not an image pattern of an unmasked part in the piece of the image data extracted from the predefined particular area concerned matches with an image pattern of an unmasked part in the predefined piece of the image data comprised in the screen type determination information;

identifying a type of the display screen based on the determining and storing the type in the screen information database;

acquiring, from the screen image data of the display screen whose type has been identified, linkage data comprising one or more constituent pieces of data respectively with a corresponding data property and respectively corresponding to an item predetermined to be used in the secondary application program from among the one or more items according to the identified type from the screen information database, where each constituent piece of data is acquired by each process in each processing mode depending on the data property predefined for each item that is predetermined to be used in the secondary application program; and outputting the linkage data to the secondary application program;

outputting linkage result information to the primary application program, the linkage result information being obtained as a result of processing the linkage data by the secondary application program; and outputting linkage result information to an area on a display screen of the primary application program based on output method information comprising coordinate information indicating an area of a display screen, the linkage result information being obtained as a result of processing the linkage data by the secondary application program.

2. The data linkage supporting method according to claim 1, further comprising, based on coordinate information indicating an area on the screen and recognition item information comprising data property information indicating the data properties of data displayed in the area, extracting data displayed in the area from the screen image data and recognizing the extracted data according to the data property information, wherein the linkage data is acquired as a recognition result.

3. A data linkage supporting method, in which a computer supports data linkage between application programs, comprising:

capturing, from a primary application program, screen image data of a display screen including one or more first areas respectively corresponding to one or more items;

extracting, from the screen image data, one or more pieces of image data respectively displayed in one or more predefined second areas in the display screen based on screen type determination information predefined for each type of a screen, where the screen type determination information is predefined so as to include respective one or more pieces of coordinate information to indicate the one or more second areas and respective one or more pieces of image data to be displayed in the one or more second areas;

determining for each of the one or more predefined particular areas, a first background color based on a distribution of color in every pixel of a piece of the image data extracted from the predefined particular area concerned and a second background color based on a distribution of color in every pixel of a predefined piece of the image data comprised in the screen type determination information corresponding to the predefined particular area concerned stored in a screen information database;

masking the first background color and the second background color;

determining whether or not an image pattern of an unmasked part in the piece of the image data extracted from the second area concerned matches with an image pattern of an unmasked part in the predefined piece of the image data comprised in the screen type determination information;

identifying a type of the display screen based on the determining and storing the type in the screen information database;

acquiring, from a secondary application program, linkage data that is obtained by the secondary application program and that comprises one or more constituent pieces of data respectively corresponding to each of the one or more items; and outputting, for each of the one or more items, a constituent piece of data that is comprised in the linkage data and that corresponds to the item concerned to the first area corresponding to the item concerned in the display screen whose type has been identified;

outputting linkage result information to an area on a display screen of the primary application program based on output method information comprising coordinate information indicating an area of a display screen, the linkage result information being obtained as a result of processing the linkage data by the secondary application program; and outputting linkage result information to the primary application program, the linkage result information being obtained as a result of processing the linkage data by the secondary application program.

4. The data linkage supporting method according to claim 1, wherein
the identifying identifies the type of the display screen if all pieces of the image data extracted from the one or more predefined particular areas match with all pieces of the image data comprised in the screen type determination information.

5. The data linkage supporting method according to claim 1, wherein
the outputting the linkage data includes:
obtaining linkage method information from the screen information database, where the linkage method information is predefined so as to include linkage destination identifying information and linkage method specifying information; and
outputting the linkage data to a linkage destination specified by the linkage destination identifying information through a linkage method specified by the linkage method specifying information.

6. The data linkage supporting method according to claim 1, further comprising:
retrieving screen image data of a display screen;
extracting the one or more pieces of image data from the retrieved screen image data based on the one or more pieces of coordinate information when the one or more predefined particular areas are designated in the display screen for the retrieved screen image data;
generating the screen type determination information including the one ore more pieces of coordinate information and the extracted one or more pieces of image data; and
storing the generated screen type determination information in the screen information database.

7. A non-transitory recording medium, which is readable by a computer and is storing a program for making the computer execute a process to support data linkage between application programs, the process comprising:
acquiring, from a primary application program, screen image data of a display screen where one or more pieces of data are displayed respectively corresponding to one or more items;
extracting, from the screen image data, one or more pieces of image data respectively displayed in one or more predefined particular areas in the display screen based on screen type determination information predefined for each type of a screen, where the screen type determination information is predefined so as to include respective one or more pieces of coordinate information to indicate the one or more predefined particular areas and respective one or more pieces of image data to be displayed in the one or more predefined particular areas;

determining, for each of the one or more predefined particular areas, whether or not an image pattern of a piece of the image data extracted from the predefined particular area concerned matches with an image pattern of a predefined piece of the image data comprised in the screen type determination information corresponding to the predefined particular area concerned stored in a screen information database;

identifying a type of the display screen based on the determining and storing the type in the screen information database;

acquiring, from the screen image data of the display screen whose type has been identified, linkage data comprising one or more constituent pieces of data respectively with a corresponding data property and respectively corresponding to an item predetermined to be used in the secondary application program from among the one or more items according to the identified type from the screen information database, where each constituent piece of data is acquired by each process in each processing mode depending on the data property predefined for each item that is predetermined to be used in the secondary application program;

outputting the linkage data to the secondary application program; outputting linkage result information to the primary application program, the linkage result information being obtained as a result of processing the linkage data by the secondary application program; and outputting linkage result information to an area on a display screen of the primary application program based on output method information comprising coordinate information indicating an area of a display screen, the linkage result information being obtained as a result of processing the linkage data by the secondary application program.

8. A data linkage supporting device, which supports data linkage between application programs, comprising:
a display screen retrieving unit for acquiring, from a primary application program, screen image data of a display screen where one or more pieces of data are displayed respectively corresponding to one or more items;
a screen type determination unit for identifying a type of the display screen;
an item information acquisition unit for acquiring linkage data to be output to a secondary application program from the acquired screen image data of the display screen whose type has been identified using a screen information database; and
a linkage processing unit for outputting the acquired linkage data to the secondary application program, and
wherein
the screen type determination unit extracts, from the screen image data, one or more pieces of image data respectively displayed in one or more predefined particular areas in the display screen based on screen type determination information predefined for each type of a screen,
the screen type determination information is predefined so as to include respective one or more pieces of coordinate information to indicate the one or more predefined particular areas and respective one or more pieces of image data to be displayed in the one or more predefined particular areas, for each of the one or more predefined particular areas, determining a first background color based on a distribution of color in every pixel of a piece of the image data extracted from the predefined particular area concerned and a second background color based on a distribution of color in every pixel of a predefined piece of the image data comprised in the screen type determination information corresponding to the predefined particular area concerned stored in a screen information database;

masking the first background color and the second background color, the screen type determination unit identifies the type based on a result of determining and stores the type in the screen information database, determines whether or not an image pattern of an unmasked part in the piece of the image data extracted from the predefined particular area concerned matches with an image pattern of an unmasked part in the predefined piece of the image data comprised in the screen type determination information, the linkage data comprises one or more constituent pieces of data respectively with a corresponding data property and respectively corresponding to an item predetermined to be used in the secondary application program from among the one or more items according to the identified type from the screen information database, the item information acquisition unit acquires each constituent piece of data by each process in each processing mode depending on the data property predefined for each item that is predetermined to be used in the secondary application program, linkage result information is output to the primary application program, the linkage result information is obtained as a result of processing the linkage data by the secondary application program, linkage result information is output to an area on a display screen of the primary application program based on output method information comprising coordinate information indicating an area of a display screen, the linkage result information is obtained as a result of processing the linkage data by the secondary application program.

9. The data linkage supporting device of claim 8, wherein the screen type determination unit defines a location and a property of data outputted to the display screen in the secondary application program.

* * * * *

UNITED STATES PATENT AND TRADEMARK OFFICE
CERTIFICATE OF CORRECTION

| | | |
|---|---|---|
| PATENT NO. | : 7,958,458 B2 | Page 1 of 1 |
| APPLICATION NO. | : 11/137364 | |
| DATED | : June 7, 2011 | |
| INVENTOR(S) | : Takayuki Maeta et al. | |

It is certified that error appears in the above-identified patent and that said Letters Patent is hereby corrected as shown below:

Column 21, Line 50, In Claim 6, after "one" delete "ore" and insert -- or --, therefor.

Signed and Sealed this
Sixteenth Day of August, 2011

David J. Kappos
*Director of the United States Patent and Trademark Office*